US010334636B2

(12) United States Patent
Cho et al.

(10) Patent No.: US 10,334,636 B2
(45) Date of Patent: Jun. 25, 2019

(54) METHOD AND DEVICE FOR ESTABLISHING VIRTUAL BEARER FOR PDN CONNECTION ESTABLISHED THROUGH WI-FI LINK IN WIRELESS COMMUNICATION SYSTEM

(71) Applicant: LG ELECTRONICS INC., Seoul (KR)

(72) Inventors: Heejeong Cho, Seoul (KR); Hyunsoo Ko, Seoul (KR); Hyeyoung Choi, Seoul (KR); Ilmu Byun, Seoul (KR); Kungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/520,044

(22) PCT Filed: Oct. 16, 2015

(86) PCT No.: PCT/KR2015/010956
§ 371 (c)(1),
(2) Date: Apr. 18, 2017

(87) PCT Pub. No.: WO2016/064142
PCT Pub. Date: Apr. 28, 2016

(65) Prior Publication Data
US 2017/0339725 A1 Nov. 23, 2017

Related U.S. Application Data

(60) Provisional application No. 62/067,951, filed on Oct. 23, 2014.

(51) Int. Cl.
*H04W 52/02* (2009.01)
*H04W 76/10* (2018.01)
(Continued)

(52) U.S. Cl.
CPC ....... *H04W 76/10* (2018.02); *H04W 52/0225* (2013.01); *H04W 76/20* (2018.02);
(Continued)

(58) Field of Classification Search
CPC .. H04B 7/18541; H04B 7/024; H04B 7/0413; H04B 7/0452; H04B 7/0495; H04B 7/2643; H04B 2201/70726; H04B 7/216; H04B 7/2668; H04B 7/2618; H04L 47/767; H04L 1/0002; H04L 1/20; H04L 1/0048; H04L 1/06; H04W 36/00; H04W 36/005; H04W 36/0016; H04W 36/0083; H04W 36/0088; H04W 36/0094; H04W 28/0257; H04W 28/04; H04W 16/28; H04W 72/0446; H04J 3/1694
See application file for complete search history.

(56) References Cited

U.S. PATENT DOCUMENTS 9,906,992 B1 * 2/2018 Youtz ................ H04W 36/0033
2011/0128865 A1 6/2011 Doppler et al.
(Continued)

FOREIGN PATENT DOCUMENTS

WO 2014/107358 A1 7/2014
WO 2014/165832 A1 10/2014

*Primary Examiner* — Sharad Rampuria
(74) *Attorney, Agent, or Firm* — Dentons US LLP

(57) ABSTRACT

Provided are a method and a device for generating a virtual bearer in a wireless communication system. A mobility management entity (MME) acquires context information for a packet data network (PDN) connection generated through a Wi-Fi network, and generates a virtual bearer in a cellular network on the basis of the acquired context information. The virtual bearer may be generated by various methods according to whether a PDN connection mapped to the PDN connection generated through the Wi-Fi network exists in the cellular network and whether a default bearer exists in the cellular network.

9 Claims, 24 Drawing Sheets

(51) Int. Cl.
*H04W 76/20* (2018.01)
*H04W 76/28* (2018.01)
*H04W 84/12* (2009.01)

(52) U.S. Cl.
CPC ........ *H04W 76/28* (2018.02); *H04W 52/0261* (2013.01); *H04W 84/12* (2013.01); *Y02D 70/122* (2018.01); *Y02D 70/126* (2018.01); *Y02D 70/14* (2018.01); *Y02D 70/20* (2018.01)

(56) References Cited

U.S. PATENT DOCUMENTS

| | | | |
|---|---|---|---|
| 2012/0069797 A1* | 3/2012 | Lim | H04W 28/18 370/328 |
| 2012/0120843 A1 | 5/2012 | Anderson et al. | |
| 2013/0003633 A1 | 1/2013 | Kim et al. | |
| 2013/0121267 A1 | 5/2013 | Koorapaty et al. | |
| 2014/0119292 A1* | 5/2014 | Zhao | H04W 36/14 370/329 |
| 2014/0169161 A1 | 6/2014 | Wang et al. | |
| 2015/0092540 A1* | 4/2015 | Choudhary | H04W 28/0289 370/230 |
| 2016/0044567 A1* | 2/2016 | Baghel | H04W 28/08 370/331 |

* cited by examiner

METHOD AND DEVICE FOR ESTABLISHING VIRTUAL BEARER FOR PDN CONNECTION ESTABLISHED THROUGH WI-FI LINK IN WIRELESS COMMUNICATION SYSTEM

CROSS-REFERENCE TO RELATED APPLICATIONS

This application is the National Stage filing under 35 U.S.C. 371 of International Application No. PCT/KR2015/010956, filed on Oct. 16, 2015, which claims the benefit of U.S. Provisional Application No. 62/067,951 filed on Oct. 23, 2014, the contents of which are all hereby incorporated by reference herein in their entirety.

BACKGROUND OF THE INVENTION

Field of the Invention

The present invention relates to wireless communication and more specifically, a method and a device for establishing a virtual bearer for a packet data network (PDN) connection established through a Wi-Fi link in a wireless communication system.

Related Art

With the recent trend of increasing high-rate data traffic, fifth generation mobile communication technologies are in discussion for their realistic and efficient backup. One of requirements for fifth generation mobile communication technologies is the interworking between heterogeneous wireless communication systems, particularly between a cellular system and a wireless local area network (WLAN) system. The cellular system may be one of a 3rd generation partnership project (3GPP) long-term evolution (LTE) system, a 3GPP LTE-A (advanced) system, and an institute of electrical and electronics engineers (IEEE) 802.16 (WiMax, WiBro) system. The WLAN system may be an IEEE 802.11 (Wi-Fi) system. In particular, WLAN is a wireless communication system that is commonly used for various user equipments, and thus, the cellular-WLAN interoperation is a high-priority convergence technique. Offloading by the cellular-WLAN interoperation may increase the coverage and capacity of the cellular system.

In other words, the fifth-generation mobile communication system may use multiple RATs in a converging manner through the interoperation between heterogeneous wireless communication systems. Each entity in the plurality of RATs constituting a fifth-generation mobile communication system may exchange information therebetween, and accordingly, the optimal communication system may be provided to a user in the fifth-generation mobile communication system. Among the plurality of RATs constituting the fifth-generation mobile communication system, a specific RAT may operate as a primary RAT system, and another specific RAT may operate as a secondary RAT system. That is, the primary RAT system may mainly play a role to provide a communication system to a user in the fifth-generation mobile communication system, while the secondary RAT system may assist the primary RAT system. In general, a 3GPP LTE(-A) or IEEE 802.16 cellular system with relatively broad coverage may be a primary RAT system, and a Wi-Fi system with relatively narrower coverage may be a secondary RAT system.

Currently, a packet data network (PDN) connection for a cellular network and a PDN connection for a Wi-Fi network are managed separately from each other. However, since more closely related inter-operation between a cellular network and a Wi-Fi network is demanded, an integrated management of a PDN connection for a cellular network and a PDN network for a Wi-Fi network are required.

SUMMARY OF THE INVENTION

The present invention provides a method and a device for establishing a virtual bearer for a packet data network (PDN) connection established through a Wi-Fi link in a wireless communication system. The present invention provides a method and a device for generating a virtual bearer for a PDN connection generated through a Wi-Fi link. The present invention provides a method and a device for transmitting establishment information for a generated virtual bearer to a user equipment.

In an aspect, a method for generating a virtual bearer by a mobility management entity (MME) in a wireless communication system is provided. The method includes obtaining context information about a packet data network (PDN) connection generated through a Wi-Fi network, and generating a virtual bearer in a cellular network by using the obtained context information.

In another aspect, a mobility management entity (MME) in a wireless communication system is provided. The MME includes a memory, a transceiver, and a processor, coupled to the memory and the transceiver, configured to obtain context information about a packet data network (PDN) connection generated through a Wi-Fi network, and generate a virtual bearer in a cellular network by using the obtained context information.

As a virtual bearer is established, interworking between a cellular network and a Wi-Fi network can be performed in an efficient manner.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE. LTE-A and IEEE 802.11 are chiefly described as an example in order to clarify the description, but the technical spirit of the present invention is not limited to LTE-A and IEEE 802.11.

Figure 1:
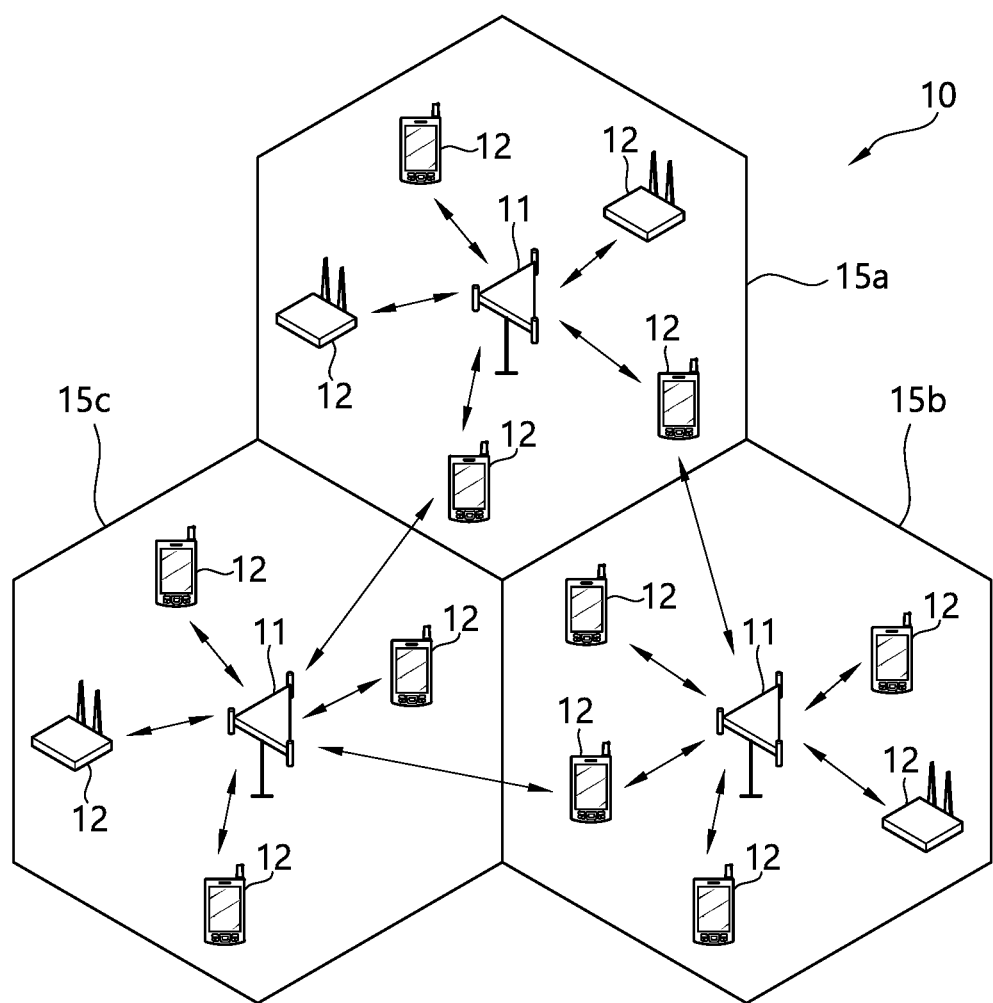
FIG. 1 shows a cellular system.

FIG. 1 shows a cellular system. Referring to FIG. 1, the cellular system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. The cellular system includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
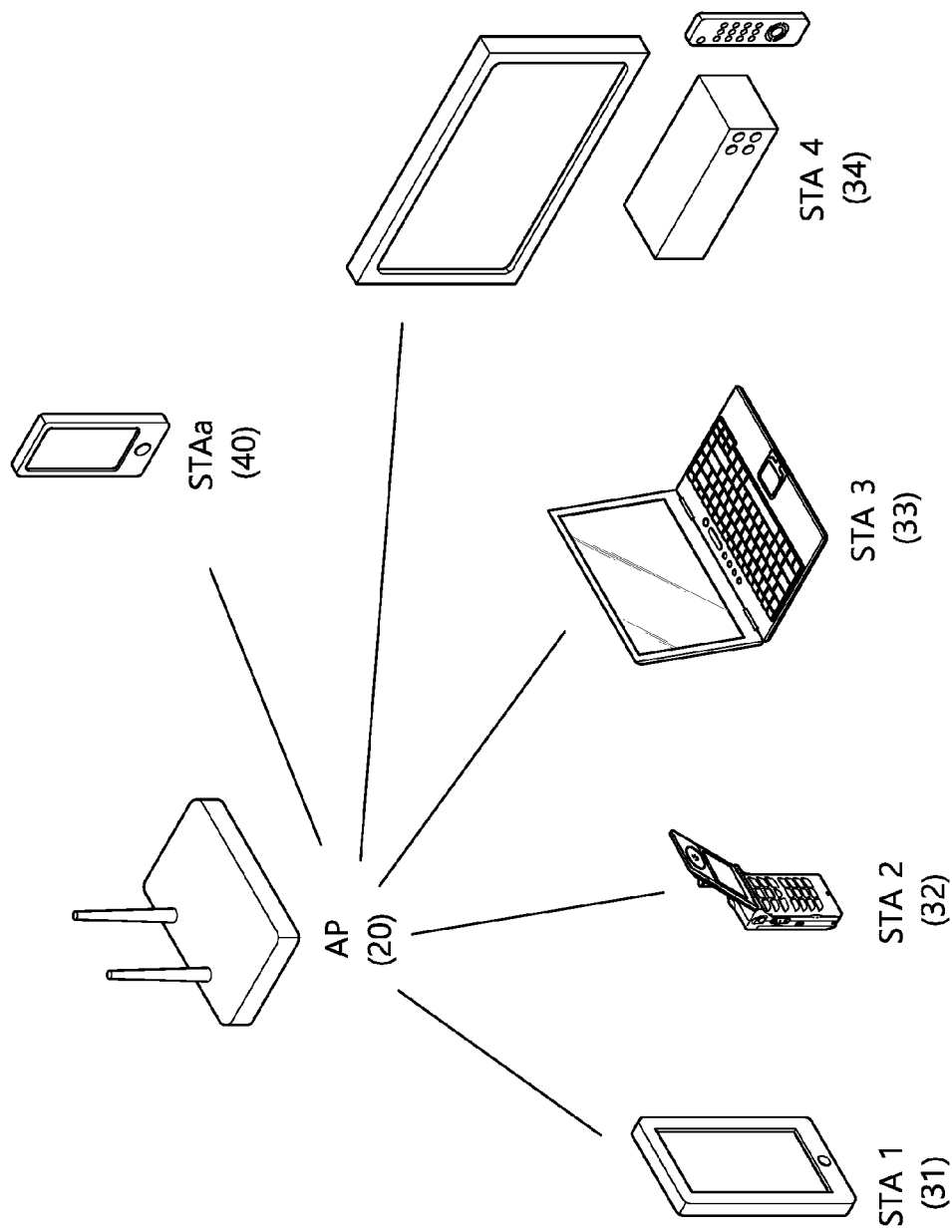
FIG. 2 shows a wireless local area network (WLAN) system.

FIG. 2 shows a wireless local area network (WLAN) system. The WLAN system may also be referred to as a Wi-Fi system. Referring to FIG. 2, the WLAN system includes one access point (AP) 20 and a plurality of stations (STAs) 31, 32, 33, 34, and 40. The AP 20 may be linked to each STA 31, 32, 33, 34, and 40 and may communicate therewith. The WLAN system includes one or more basic service sets (BSSs). The BSS is a set of STAs that may be successfully synchronized with each other and may communicate with each other, and does not mean a specific region.

An infrastructure BSS includes one or more non-AP stations, APs that provide a distribution service (DS), and a DS that links a plurality of APs with each other. In the infrastructure BSS, an AP manages non-AP STAs of the BSS. Accordingly, the WLAN system shown in FIG. 2 may include an infrastructure BSS. In contrast, an independent BSS (IBSS) is a BSS that operates in ad-hoc mode. The IBSS does not include an AP and thus lacks a centralized management entity. That is, in the IBSS, the non-AP STAs are managed in a distributed manner. The IBSS may have all the STAs constituted of mobile STAs and is not allowed to access the distribution system, thus achieving a self-contained network.

The STA is random functional medium that includes a physical layer interface for a wireless medium and an media access control (MAC)) observing IEEE 802.11 standards, and in its broader concepts, it includes both the AP and non-AP station.

The non-AP STA is an STA, not an AP. The non-AP STA may also be referred to as a mobile terminal, a wireless device, a wireless transmit/receive unit (WTRU), a user equipment (UE), a mobile station (MS), a mobile subscriber unit or simply as a user. Hereinafter, for ease of description, the non-AP STA denotes an STA.

The AP is a functional entity that provides access to a distribution system via a wireless medium for an STA associated with the AP. In the infrastructure BSS including an AP, communication between STAs is basically done via an AP, but in case a direct link is established, direct communication may be achieved between STAs. The AP may also be referred to as a central controller, a base station (BS), a NodeB, a base transceiver system (BTS), or a site controller.

A plurality of infrastructure BSSs may be linked with each another through a distribution system. The plurality of BSSs linked with each another is referred to as an extended service set (ESS). The APs and/or STAs included in the ESS may communicate with each other, and in the same ESS, an STA may move from one BSS to another, while in seamless communication.

Figure 3:
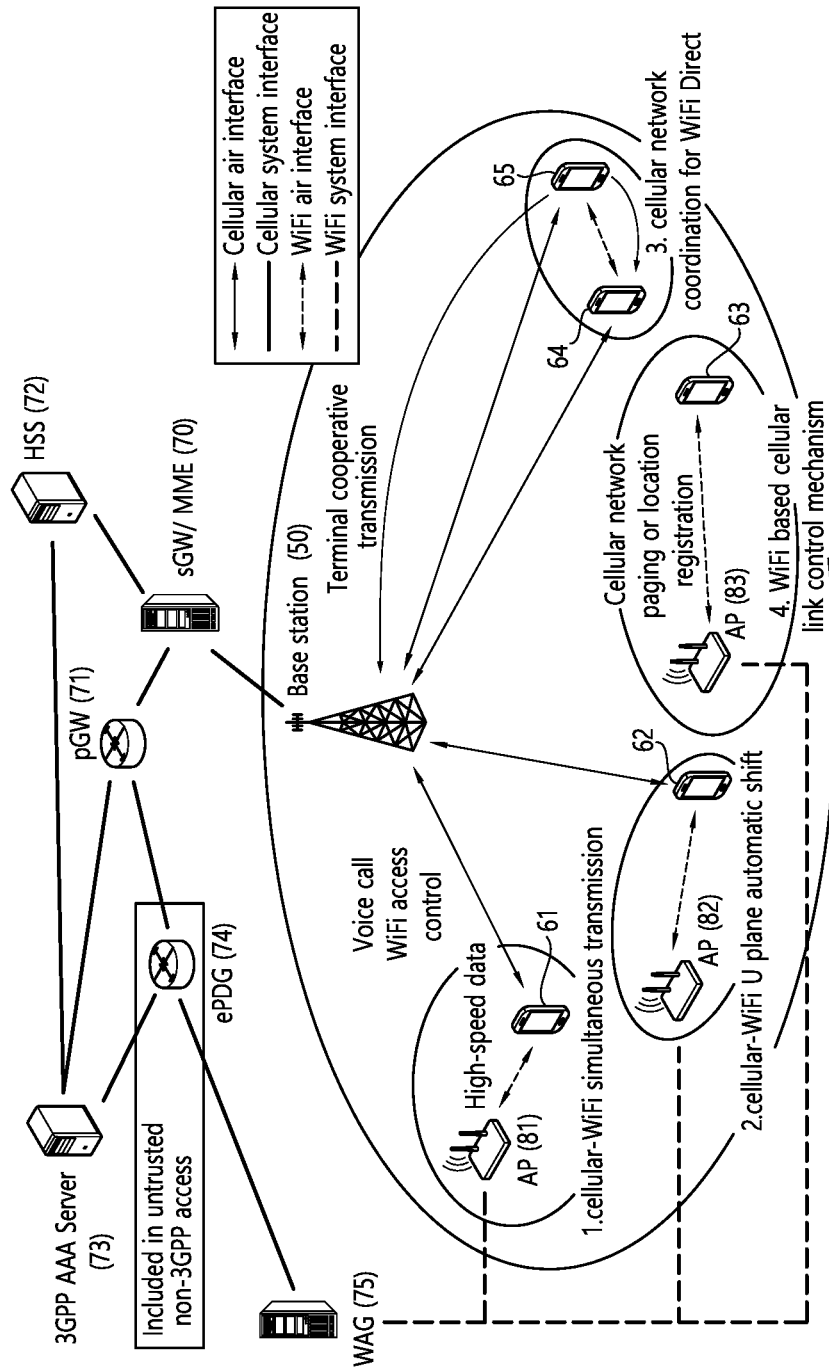
FIG. 3 shows an example of a scenario of a converged communication system of a cellular system and a Wi-Fi system.

FIG. 3 shows an example of a scenario of a converged communication system of a cellular system and a Wi-Fi system.

It is assumed in FIG. 3 that the cellular system operates as a primary RAT system of the converged communication system, and the Wi-Fi system operates as a secondary RAT system of the converged communication system. Further, the cellular system may be a 3GPP LTE(-A) system. Hereinafter, for ease of description, it is assumed that the primary RAT system of the converged communication system is a 3GPP LTE(-A) system, and the secondary RAT system of the communication system is an IEEE 802.11 system, i.e., a Wi-Fi system. However, embodiments of the present invention are not limited thereto.

Referring to FIG. 3, there are a plurality of general devices 61, 62, 63, 64, and 65 in the coverage of the cellular base station 50. Each of the general devices 61, 62, 63, 64, and 65 may be a user equipment in a cellular system. The cellular base station 50 may communicate with each of the general devices 61, 62, 63, 64, and 65 via a cellular radio interface. For example, the cellular base station 50 may perform voice call communication with each of the general devices 61, 62, 63, 64, and 65 or may control access of each general device 61, 62, 63, 64, and 65 to a Wi-Fi system.

The cellular base station 50 is connected to a serving gateway (S-GW)/mobility management entity (MME) 70 through a cellular system interface. The MME contains a user equipment's access information or information on a user equipment's capability, and such information may be mainly used for mobility management. The MME is in charge of a control plane. The S-GW is a gateway having an E-UTRAN as an end point. The S-GW is in charge of a user plane. The S-GW/MME 70 is connected to a packet data network (PDN) gateway (P-GW) 71 and a home subscriber server (HSS) 72 through the cellular system interface. The PDN-GW is a gateway having a PDN as an end point.

The P-GW 71 and the HSS 72 are connected to a 3GPP access authentication authorization (AAA) server 73 through the cellular system interface. The P-GW 71 and the 3GPP AAA server 73 may be connected to an evolved packet data gateway (ePDG) 74 through the cellular system interface. The ePDG 74 may be included only in un-trusted non-3GPP access. The ePDG 74 may be connected to a WLAN access gateway (WAG) 75. The WAG 75 may be in charge of a P-GW in a Wi-Fi system.

Meanwhile, a plurality of APs 81, 82, and 83 may be present in the coverage of the cellular base station 50. Each of the APs 81, 82, and 83 may have coverage which is shorter than that of the cellular base station 50. Each of the APs 81, 82, and 83 may communicate with general devices 61, 62, and 63 that are present in its coverage through a Wi-Fi radio interface. In other words, the general devices 61, 62, and 63 may communicate with the cellular base station 50 and/or APs 81, 82, and 83. Communication methods of the general devices 61, 62, and 63 are as follows:

1) Cellular/Wi-Fi simultaneous radio transmission: the general device 61 may perform high-speed data communication with the AP 81 through a Wi-Fi radio interface while communicating with the cellular base station 50 through a cellular radio interface.

2) Cellular/Wi-Fi user plane automatic shift: the general device 62 may communicate with one of the cellular base station 50 and the AP 82 by user plane automatic shift. At this time, the control plane may be present in both the cellular system and the Wi-Fi system or only in the cellular system.

3) Terminal cooperative transmission: the general device 64 operating as a source device may directly communicate with the cellular base station 50 through a cellular radio interface or may indirectly communicate with the cellular base station 50 through a general device 65 operating as a cooperative device. That is, the cooperative device 65 may assist the source device 64 so that the source device 64 may indirectly communicate with the cellular base station 50 through itself. The source device 64 and the cooperative device 65 communicate with each other through a Wi-Fi radio interface.

4) Wi-Fi-based cellular link control mechanism: the AP 83 may perform a cellular link control mechanism such as paging or location registration of a network for the cellular general device 63. The general device 63 is not directly connected to the cellular base station 50 and may indirectly communicate with the cellular base station 50 through the AP 83.

Each of the APs 81, 82, and 83 is connected to the WAG 75 through a Wi-Fi system interface.

Figure 4:
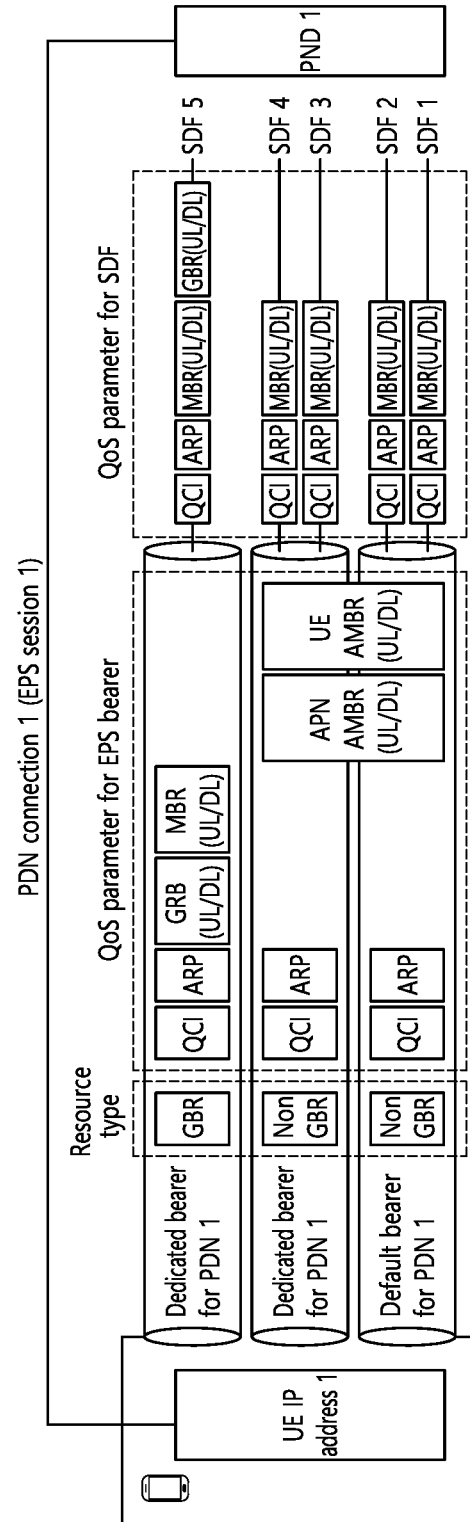
FIG. 4 illustrates one example of QoS for a PDN connection.

FIG. 4 illustrates one example of QoS for a PDN connection. Referring to FIG. 4, PDN connection 1 (or evolved packet system (EPS) session 1) between the UE Internet protocol (IP) 1 owned by the UE and PDN 1 is established. Through the PDN connection 1, at least one default bearer and at least one dedicated bearer may be established. Resource type, quality of service (QoS) parameter, etc., may be established for each bearer variously. The resource type may be classified to guaranteed bit rate (GBR) or non-GBR. The QoS parameter may include QoS class identifier (QCI), allocation and retention priority (ARP), GBR, maximum bit rate (MBR), access point name aggregate maximum bit rate (APN-AMBR), and UE-AMBR, etc.

Now, described will be an EPS bearer identity (ID) for Sb2/S2a based on GPRS tunneling protocol (GTP). The 3GPP TS 23.402 V12.6.0 (September 2014) may be referenced for the EPS bearer ID. Regarding the GTP-based S2b, an EPS bearer ID uniquely identifies an S2b bearer between ePDG and P-GW for one UE connected through a non-3GPP connection. The ePDG allocates the EPS bearer ID, but the UE is not aware of the EPS bearer ID. Regarding the GTP-based S2a, an EPS bearer ID uniquely identifies an S2a bearer between trusted WLAN access network (TWAN) and P-GW for one UE connected through a trusted WLAN connection. The TWAN allocates the EPS bearer ID, but the UE is not aware of the EPS bearer ID. The EPS bearer ID allocated to a specific UE on the S2b or S2a is independent from the EPS bearer ID allocated for the same UE on S5/S8, but the two EPS bearer IDs may be of the same value.

Figure 5:
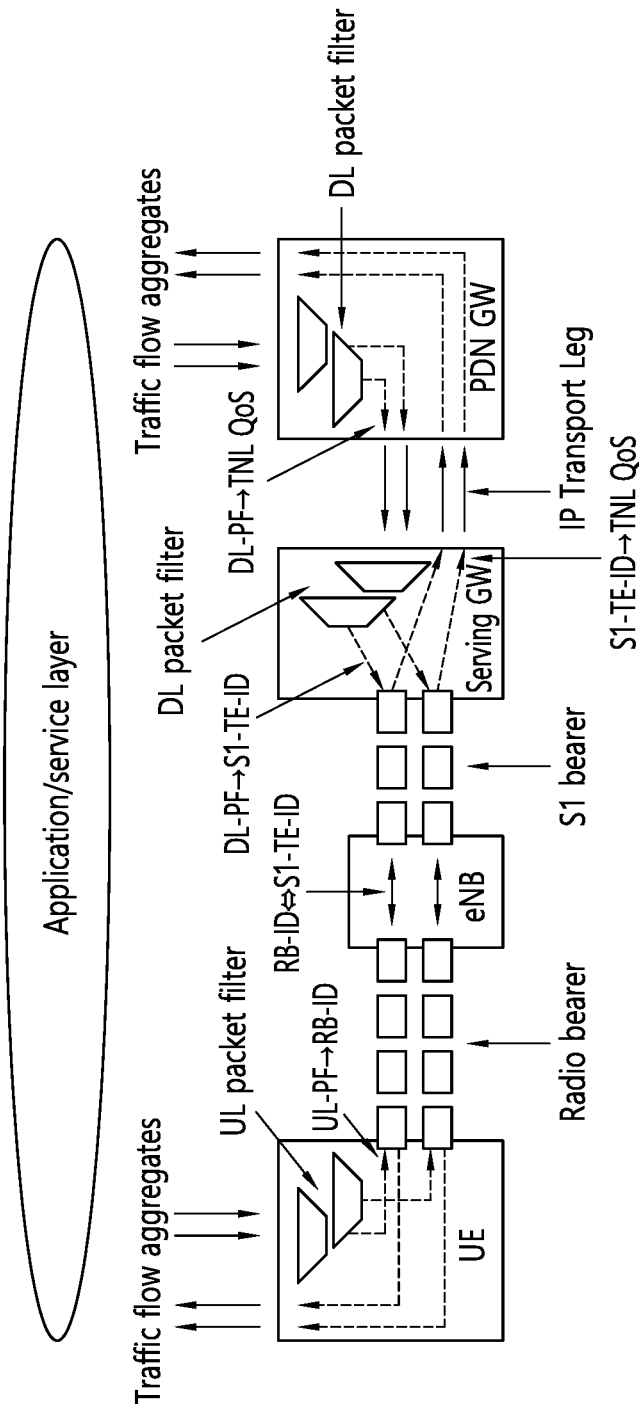
FIG. 5 illustrates two unicast EPS bearers for PIMP-based S5/S8 and E-UTAN access.

FIG. 5 illustrates two unicast EPS bearers for PIMP-based S5/S8 and E-UTAN access. For proxy mobile IP (PMIP) based S5/S8 and E-UTRAN access, an EPS bearer comprises concatenation of one radio bearer and one S1 bearer. A PDN connectivity service between a UE and an external packet data network is supported through an EPS bearer between a serving GW and P-GW and concatenation of IP connectivity. The transport network layer (TNL) supports QoS control between a serving GW and P-GW. An EPS bearer is implemented as follows.

In UE, the UL traffic flow template (TFT) maps traffic flow aggregates to the EPS bearer in UL.

In serving GW, the DL TFT maps traffic flow aggregates to the EPS bearer in DL.

The radio bearer delivers packets of the EPS bearer between the UE and the eNB. One-to-one mapping is formed between the EPS bearer and radio bearer.

The S1 bearer delivers packets of the EPS bearer between the eNB and serving GW. One-to-one mapping is formed between the EPS bearer and S1 bearer.

Each PDN tunnel per UE delivers packets of the EPS bearer between the serving GW and P-GW. Many-to-one mapping is formed between the EPS bearer and each PDN tunnel per UE.

The UE stores mapping between the UL packet filter and radio bearer to generate mapping between traffic flow aggregates and radio bearer in UL.

The eNB stores one-to-one mapping between the radio bearer and S1 bearer to generate binding between the radio bearer and S1 bearer in UL and DL.

The serving GW stores one-to-one mapping between the DL packet filter and S1 bearer to generate mapping between traffic flow aggregates and S1 bearer in DL.

The PDN-GW forces APN-AMBR throughout all service data flows (SDFs) of the same APN related to non-GBR QCI.

Figure 6:
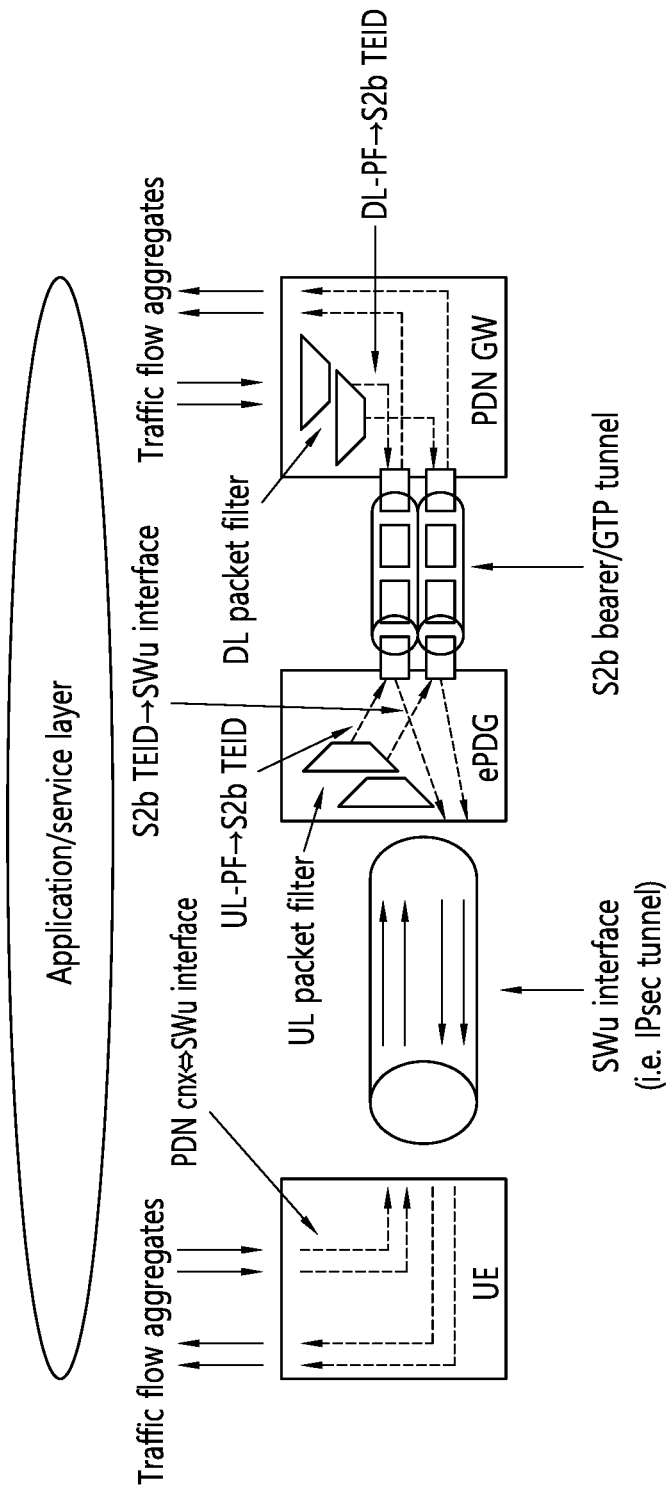
FIG. 6 illustrates two unicast EPS bearers for GTP-based S2b.

FIG. 6 illustrates two unicast EPS bearers for GTP-based S2b. Regarding an untrusted non-3GPP connection to the evolved packet core (EPC), the IPsec connectivity between the UE and ePDG continued by the S2b bearer between the ePDG and P-GW provides a PDN connectivity service. The SWu interface between the UE and ePDG is the same as that in the GTP and PMIP. The UE establishes a separate SWu interface for each PDN connection (namely separated IPsec tunnel). One default S2b bearer is established on the S2b interface when the UE is connected to the PDN, and the default S2b bearer remains as being established for the lifetime of a PDN connection to always provide IP connectivity to the corresponding PDN. According to the policy of the operator, an additional dedicated S2b bearer may be established on the S2b for the same PDN connection. The P-GW establishes a dedicated S2b bearer on the S2b for the same PDN connection according to policy and charging control (PCC). The ePDG releases the SWu interface when the default S2b bearer of a related PDN connection is released. The S2b bearer is implemented as follows.

The GTP tunnel on the S2b delivers packets of the S2b bearer between the ePDG and P-GW.

The ePDG stores mapping between the UL packet filter received from the P-GW and the corresponding S2b bearer.

P-GW stores mapping between the DL packet filter and the S2b bearer.

To support UE connectivity in the PDN, the SWu interface (namely IPsec tunnel) delivers packets of all of the S2b bearers for the same PDN connection between the UE and the ePDG. By using the same method that the UE has employed for UL traffic in a 3GPP access, the ePDG routes UL packets to other bearers on the basis of the UL packet filter within the TFT allocated to a bearer for a PDN connection. In case no matched packet is found, the UL data packet is transmitted through a bearer to which no UL packet filter has been allocated. In case the UL packet filter is allocated to all of the bearers including the default bearer for the corresponding PDN, the ePDG discards the UL data packet. By using the same method that the P-GW has employed for a GTP-based S5/S8 bearer, the P-GW routes DL packets to other bearers on the basis of the DL packet filter within the TFT allocated to the S2b bearer for a PDN connection.

Currently, a bearer acting as a logical path of data transmitted through a cellular network controlled by the MME and a bearer acting as a logical path of data transmitted through a Wi-Fi network controlled by the ePDG or TWAN are now managed independently from each other. Therefore, the cellular network does not know which data flow is transmitted through the Wi-Fi network. Also, the UE does not know information of a bearer mapped to each data flow transmitted through the Wi-Fi network. In other words, since the current system only supports offloading between networks based on a request of the UE, the UE has to inform the cellular network explicitly about which data flow is transmitted through the Wi-Fi network.

To solve the problem above, integrated management for a PDN connection is required. For example, in case a PDN connection has been already established to perform UE request-based offloading and simultaneous integrated transmission, it should be designed so that a UE does not deliver to the cellular network all of the information about a target PDN connection to be moved to other network irrespective of a generated RAT. Also, it should be designed so that the UE request-based offloading and simultaneous integrated transmission may be applied simultaneously to a dedicated bearer as well as the default bearer. In other words, it should be designed so that the dedicated bearer is generated after the default bearer is generated, and the UE request-based offloading and simultaneous integrated transmission may not be applied sequentially. For the cellular network control-based offloading and simultaneous integrated transmission, the cellular network needs to know the information about each PDN connection (namely bearer or EPS bearer) of the data transmitted through the current Wi-Fi network.

In what follows, described will be a method for establishing/generating a virtual bearer for a PDN connection generated through a Wi-Fi network according to an embodiment of the present invention. Integrated management of a PDN connection is made possible by establishing/generating a virtual bearer for a PDN connection generated through a Wi-Fi network according to an embodiment of the present invention.

Now, described will be a trigger condition for establishing a virtual bearer according to an embodiment of the present invention. The establishment of a virtual bearer may be triggered when generation or release of a PDN connection through a Wi-Fi network is performed. In other words, establishment of a virtual bearer may be triggered by the procedure of generating or releasing a PDN connection through a Wi-Fi network. At this time, triggering of establishment of a virtual bearer may be initiated by the P-GW, HSS, or MME. More specifically, a selected P-GW may inform a 3GPP AAA server of the P-GW ID, and the 3GPP AAA server may inform the HSS of the P-GW ID and the APN related to the PDN connection of the UE. Or, establishment of a virtual bearer may be triggered when movement/integrated transmission of data from a Wi-Fi network to a cellular network is determined by a cellular network node. At this time, triggering of establishment of a virtual bearer may be initiated by the eNB or MME. Or, establishment of a virtual bearer may be triggered when a context pre-setup request of the UE about a PDN connection generated through a Wi-Fi network is received. At this time, triggering of establishment of a virtual bearer may be initiated by the eNB or MME.

Now, described will be a method for generating a virtual bearer according to an embodiment of the present invention. A virtual bearer may be generated between the S-GW and P-GW. In case a PDN connection corresponding to a cellular network pre-exists, a virtual bearer may be mapped to an existing PDN connection. For example, in case a PDN connection to the same P-GW has been already activated by using the same QoS (QCI and ARP) with respect to the same APN, or a PDN connection to the same P-GW has been already activated by using the same QoS (QCI, ARP, GBR, and MBR) with respect to the same APN and TFT, a virtual bearer may be mapped to an existing PDN connection. Meanwhile, in the absence of a PDN connection corresponding to the cellular network, a new PDN connection may be generated. Since the corresponding PDN connection is a user data path through which data is generated/delivered via a Wi-Fi network, a procedure related to wireless connection (for example, resource allocation related to a radio bearer and resource allocation between the eNB and S-GW) may not be performed, nor may the eNB-related information (S1 eNB TEID, user location information) be included.

Figure 7:
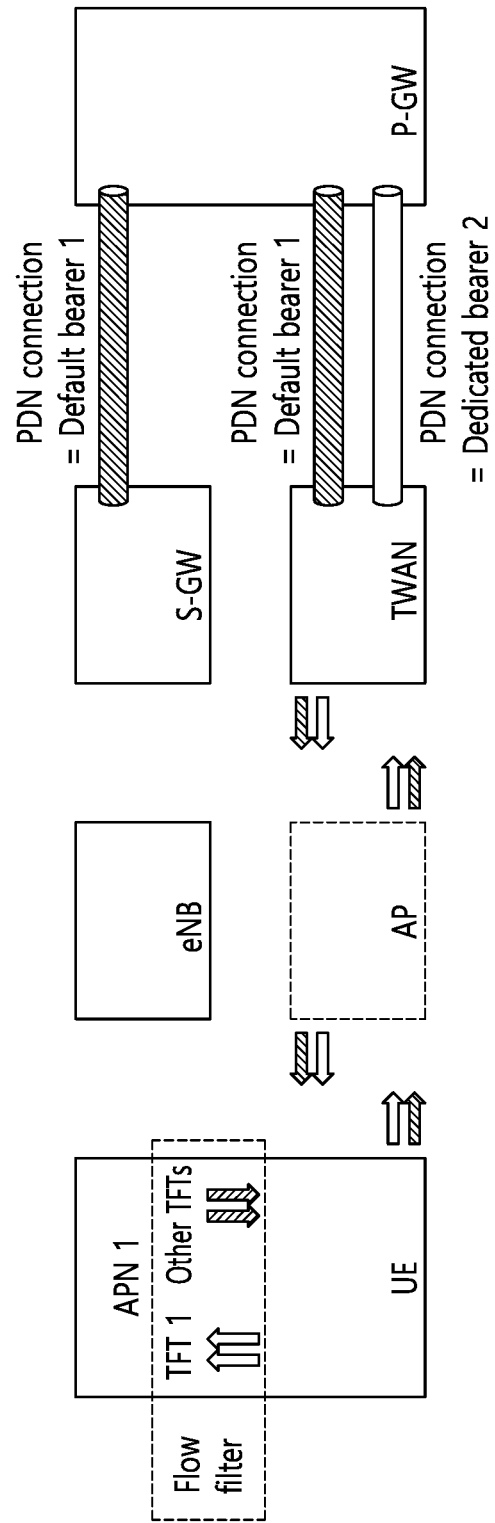
FIG. 7 illustrates an example of establishing a virtual bearer according to an embodiment of the present invention.

FIG. 7 illustrates an example of establishing a virtual bearer according to an embodiment of the present invention. Referring to FIG. 7, a PDN connection corresponding to a default bearer 1 (S2a bearer 1) between the S-GW and P-GW is already present. Also, a default bearer 1 (S5 bearer 1) and a PDN connection corresponding to a dedicated bearer 2 (S5 bearer 2) between the TWAN and P-GW are already present. At this time, according to a method for establishing a virtual bearer according to an embodiment of the present invention, the S2a bearer 1 is mapped to the S5 bearer 1, and the S2a bearer 2 is newly generated.

Figure 8:
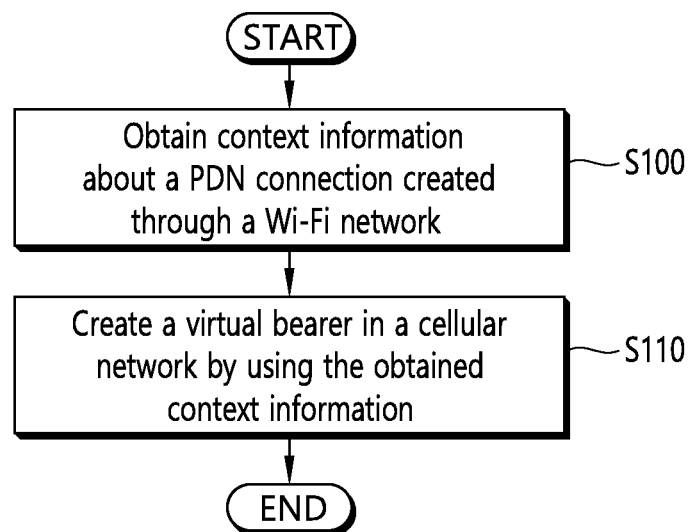
FIG. 8 illustrates an example of a procedure for generating a virtual bearer according to an embodiment of the present invention.

FIG. 8 illustrates an example of a procedure for generating a virtual bearer according to an embodiment of the present invention. In the embodiment of FIG. 8, it is assumed that a procedure of generating a virtual bearer is triggered by the MME.

In step S100, the MME obtains context information about a PDN connection generated through a Wi-Fi network. The context inform may include APN, P-GW ID, and QoS. More specifically, the MME may receive information such as APN configuration (APN, P-GW ID, ACI, ARP, etc.) from the HSS. At this time, an existing interface and message may be used. Similarly, the MME may receive information such as APN configuration (APN, P-GW ID, ACI, ARP, etc.) from the ePDG. At this time, an interface should be newly defined between the MME and ePDG. Similarly, the MME may receive information such as the APN configuration (APN, P-GW ID, ACI, ARP, etc.) from the TWAN. At this time, an interface should be newly defined between the MME and TWAN.

In step S110, the MME generates a virtual bearer in the cellular network by using the obtained context information. When there is no existing PDN connection mapped to the virtual bearer nor a default bearer in the cellular network, the MME may request creation of a default bearer through a create session request. Similarly, when there is no existing PDN connection mapped to a virtual bearer nor a default bearer in the cellular network, but there exists a linked bearer for the corresponding default bearer, the P-GW may request creation of a dedicated bearer through a create bearer request. When there is no existing PDN connection mapped to a virtual bearer, but there exists a default bearer in the cellular network, the MME may request creation of a dedicated bearer through a bearer resource command.

In what follows, described with reference to various embodiments of the present invention will be a procedure for generating a virtual bearer according to whether there is an existing PDN connection mapped to a virtual bearer, and there exists a default bearer in the cellular network. In the embodiment below, it is assumed that the MME triggers a procedure for generating a virtual bearer.

Figure 9:
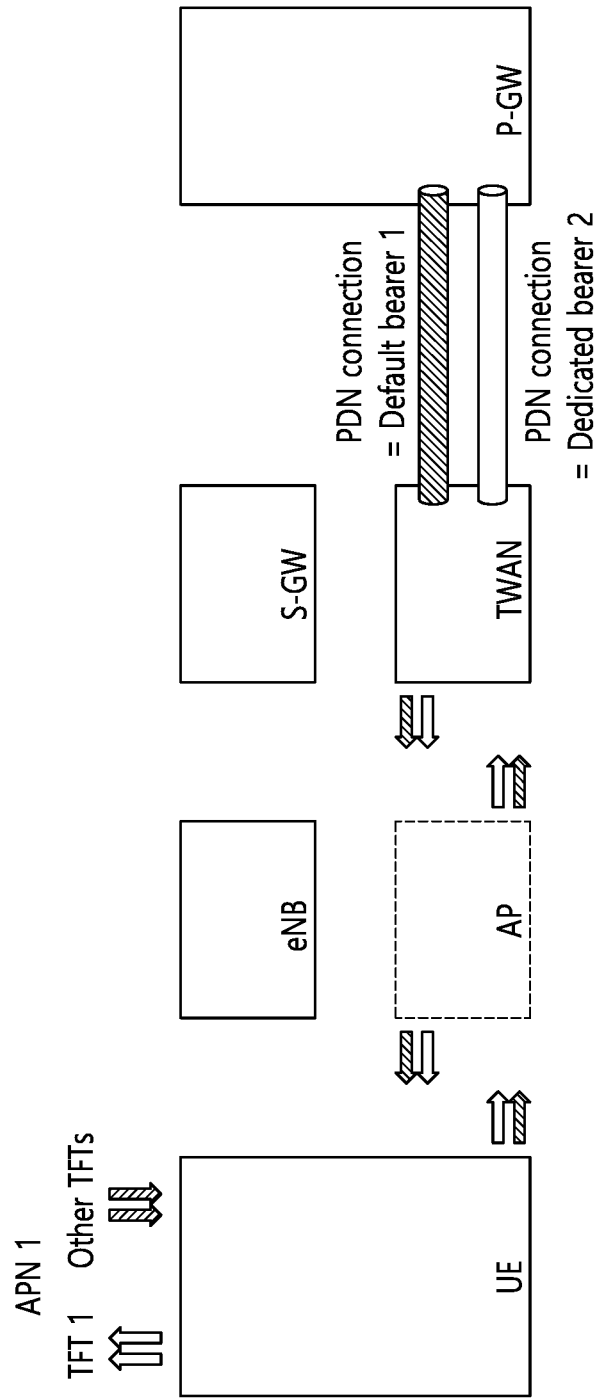
FIG. 9 illustrates an example of a bearer state before a virtual bearer is generated according to an embodiment of the present invention.

FIG. 9 illustrates an example of a bearer state before a virtual bearer is generated according to an embodiment of the present invention. Referring to FIG. 9, there is no existing PDN connection mapped to a virtual bearer between the S-GW and P-GW nor there exists a default bearer. Between the TWAN and P-GW, there already exists a PDN connection corresponding to the default bearer 1 and dedicated bearer 2.

Figure 10:
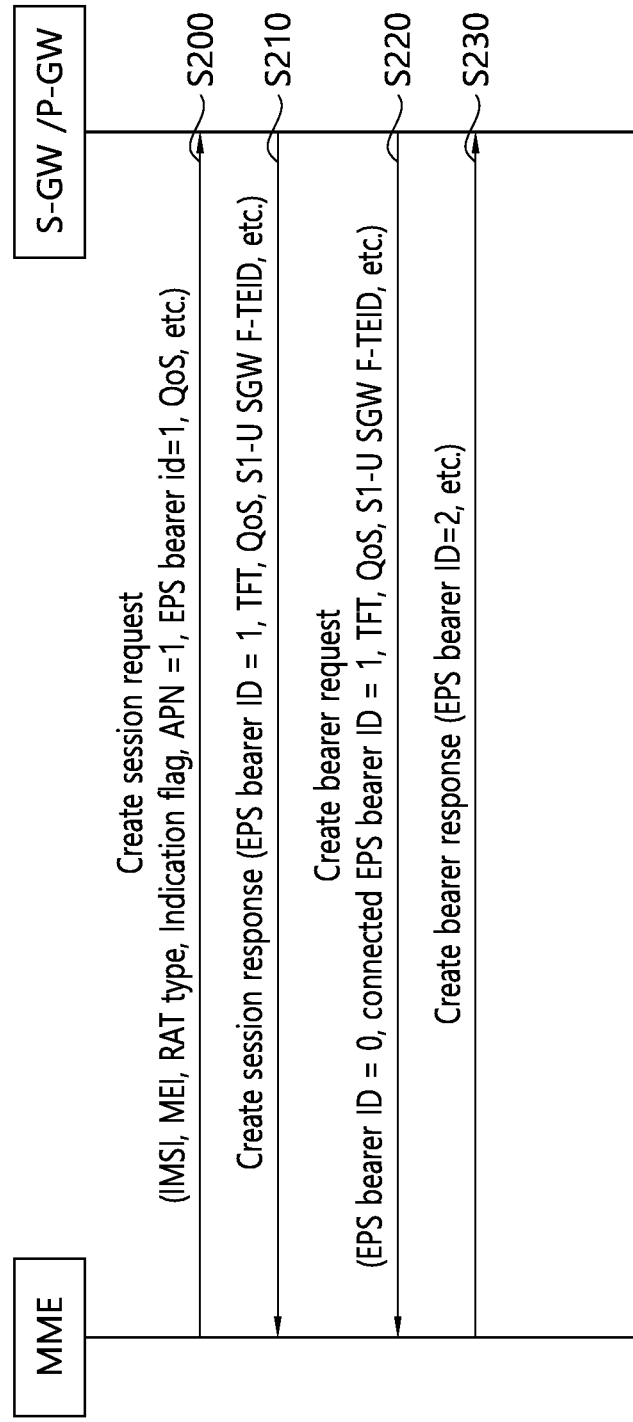
FIG. 10 illustrates an example of a procedure for generating a virtual bearer according to an embodiment of the present invention.

FIG. 10 illustrates an example of a procedure for generating a virtual bearer according to an embodiment of the present invention. FIG. 10 describes a method for generating a virtual bearer when there is no existing PDN connection mapped to a virtual bearer between the S-GW and P-GW nor there exists a default bearer as in FIG. 9.

In step S200, the MME requests creation of a new PDN connection (namely EPS default bearer) by transmitting a create session request to the S-GW/P-GW. The create session request may include basic information of a UE such as international mobile subscriber identity (IMSI) and mobile equipment identity (MEI), RAT type, indication flag, APN information configured in a Wi-Fi network, EPS bearer ID, and QoS, etc. The indication flag may inform that the corresponding create session request requests establishing a virtual bearer for a Wi-Fi PDN connection.

In step S210, the P-GW which has received a create session request creates the S5 bearer by transmitting a create session response to the MME. The create session response may include an EPS bearer ID, information about traffic flow transmitted and received through a Wi-Fi network, and QoS (QCI, ARP, APN-AMBR, and UE-AMBR) to be applied for a cellular network for the flow, etc.

In case there exists a dedicated bearer for the corresponding default bearer in the Wi-Fi network, in step S220, the P-GW may create an additional S5 bearer for the corresponding dedicated bearer by transmitting a create bearer request to the MME. At this time, the create bearer request may include an EPS bearer ID, a connected EPS bearer ID, information of traffic flow transmitted and received through a Wi-Fi network, and QoS (QCI, ARP, APN-AMBR, and UE-AMBR) to be applied to a cellular network, etc. In step S230, the MME may transmit a create bearer response to the S-GW/P-GW. The create bearer response may include the EPS bearer ID.

Figure 11:
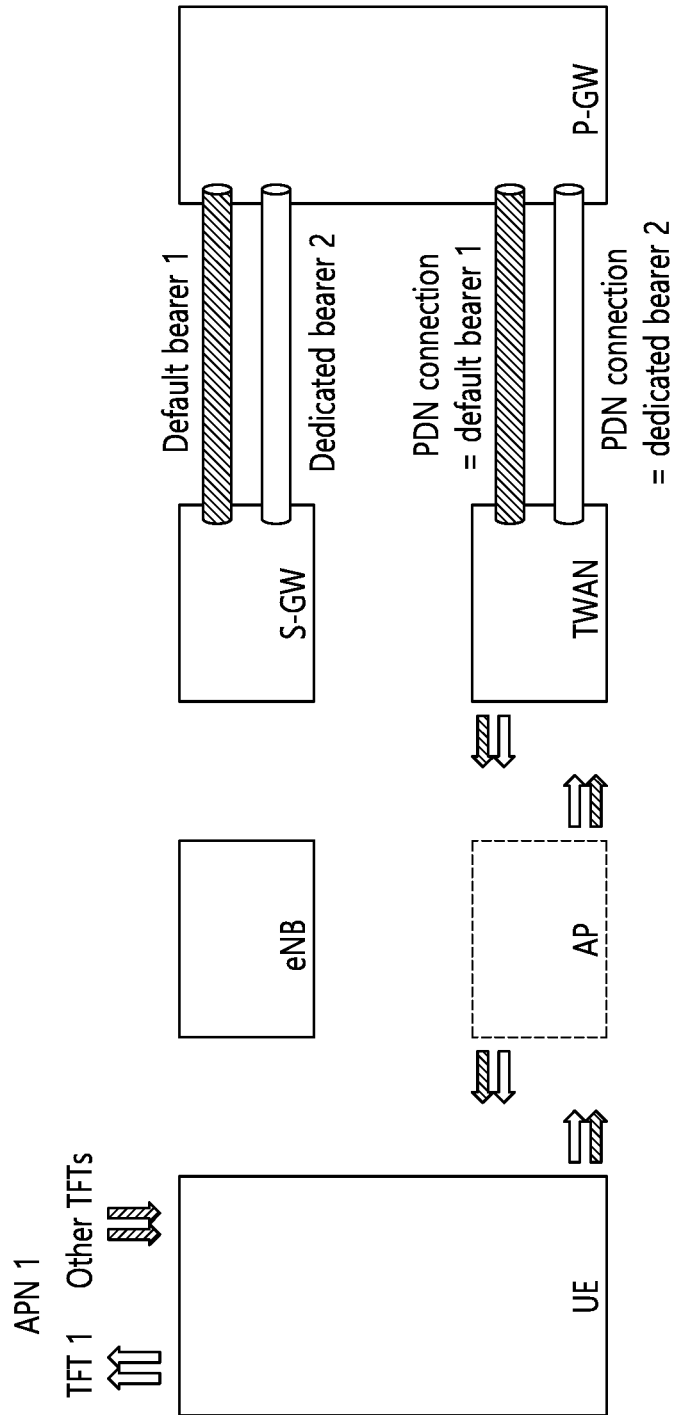
FIG. 11 illustrates an example of a bearer state after a virtual bearer is generated according to an embodiment of the present invention.

FIG. 11 illustrates an example of a bearer state after a virtual bearer is generated according to an embodiment of the present invention. Referring to FIG. 11, compared with the state before the virtual bearer is generated in FIG. 9, virtual bearers, default bearer 1 and dedicated bearer 2, are generated between the S-GW and P-GW according to the procedure for generating a virtual bearer of FIG. 10. The virtual default bearer 1 is mapped to the default bearer 1 between the TWAN and P-GW, and the virtual dedicated bearer 2 is mapped to the dedicated bearer 2 between the TWAN and P-GW.

Figure 12:
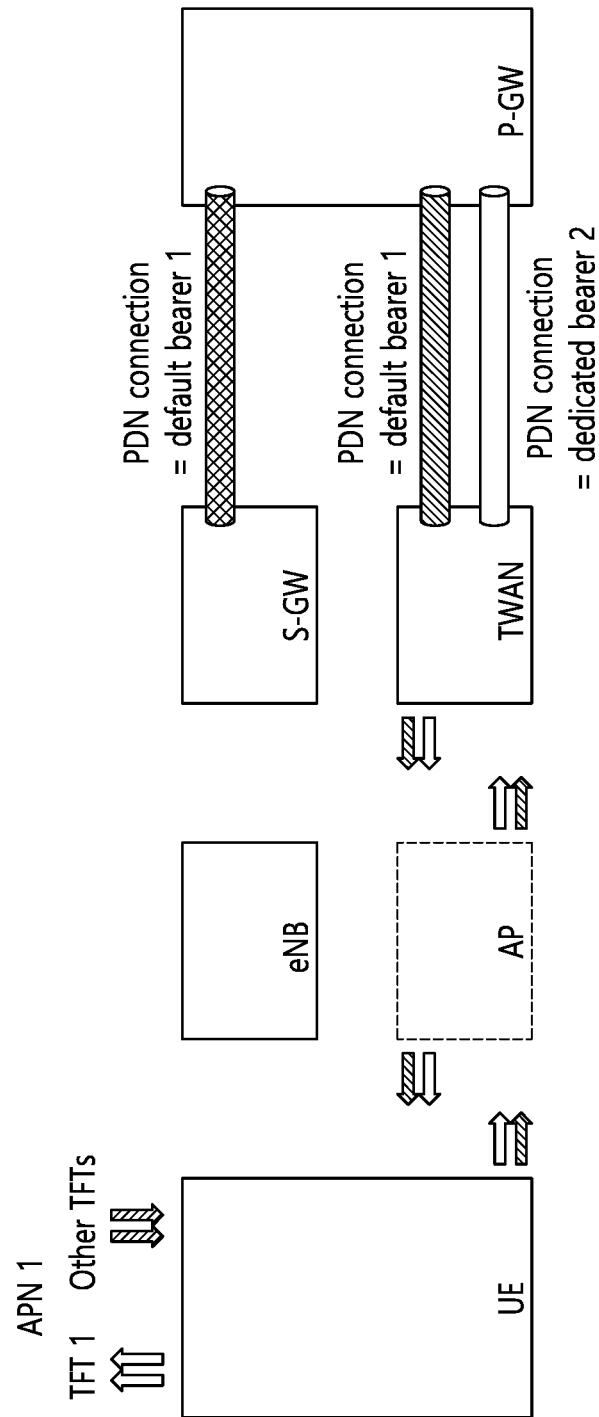
FIG. 12 illustrates an example of a bearer state before a virtual bearer is generated according to another embodiment of the present invention.

FIG. 12 illustrates an example of a bearer state before a virtual bearer is generated according to another embodiment of the present invention. Referring to FIG. 12, there exists no existing PDN connection between the S-GW and P-GW mapped to a virtual bearer, but there exists a default bearer between the S-GW and P-GW. PDN connections corresponding to the default bearer 1 and the dedicated bearer 2 are already present between the TWAN and P-GW.

Figure 13:
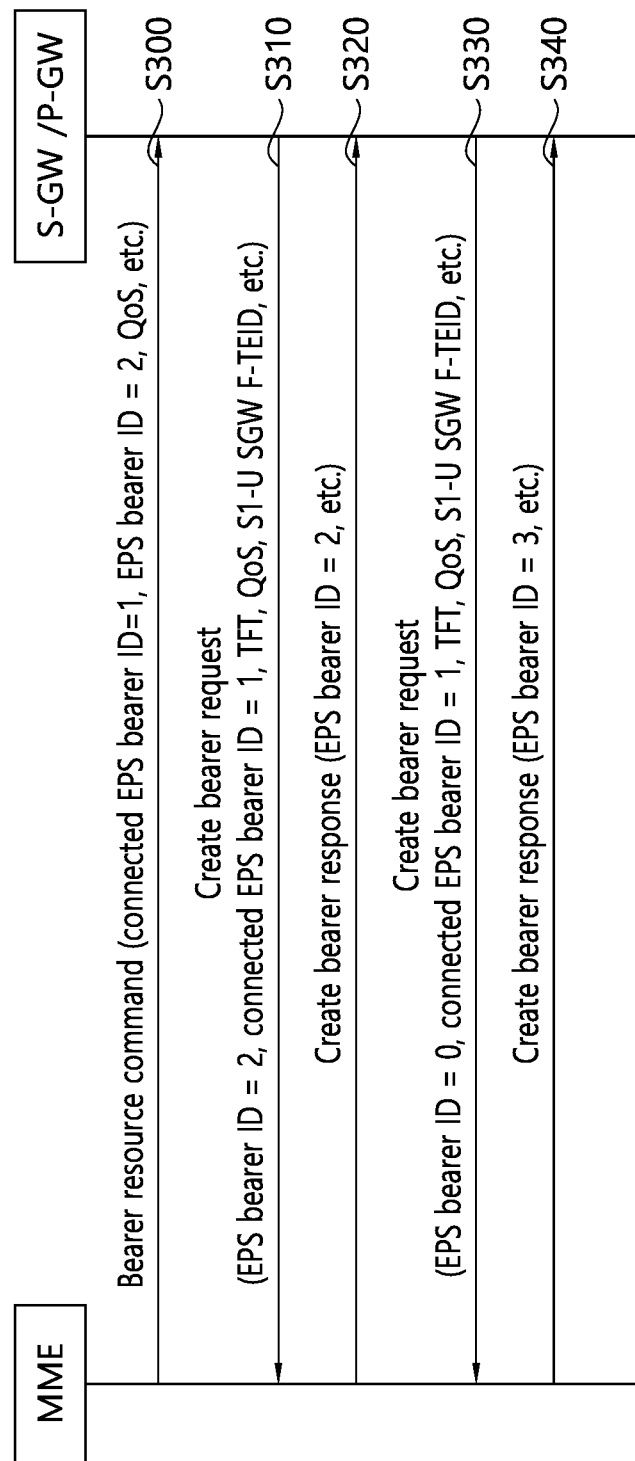
FIG. 13 illustrates an example of a procedure for generating a virtual bearer according to another embodiment of the present invention.

FIG. 13 illustrates an example of a procedure for generating a virtual bearer according to another embodiment of the present invention. FIG. 13 illustrates a method for generating a virtual bearer where there is no existing PDN connection mapped to a virtual bearer between the S-GW and P-GW, but there is a default bearer as in FIG. 12.

In step S300, the MME requests creation of a new PDN connection (namely EPS dedicated bearer) by transmitting a bearer resource command to the S-GW/P-GW. The bearer resource command may include an EPS bearer ID and a connected EPS bearer ID, which is default bearer information, and the bearer resource command may inform that the corresponding bearer resource command commands establishing a virtual bearer for a Wi-Fi PDN connection.

In step S310, the P-GW which has received the bearer resource command creates an S5 bearer by transmitting a create bearer request to the MME. The create bearer request may include an EPS bearer ID, connected EPS bearer ID, information about traffic flow transmitted and received through a Wi-Fi network, and QoS (QCI, ARP, APN-AMBR, and UE-AMBR) to be applied to a cellular network for the flow. In step S320, the MME transmits a create bearer response to the S-GW/P-GW. The create bearer response may include the EPS bearer ID.

In the presence of an additional dedicated bearer in the Wi-Fi network, in step S330, the P-GW may create an additional S5 bearer for the corresponding dedicated bearer by transmitting a create bearer request to the MME. At this time, the create bearer request may include an EPS bearer ID, connected EPS bearer ID, information about traffic flow transmitted and received through a Wi-Fi network, and QoS (QCI, ARP, APN-AMBR, and UE-AMBR) to be applied to a cellular network for the flow. In step S340, the MME may transmit a create bearer response to the S-GW/P-GW. The create bearer response may include an EPS bearer ID.

Figure 14:
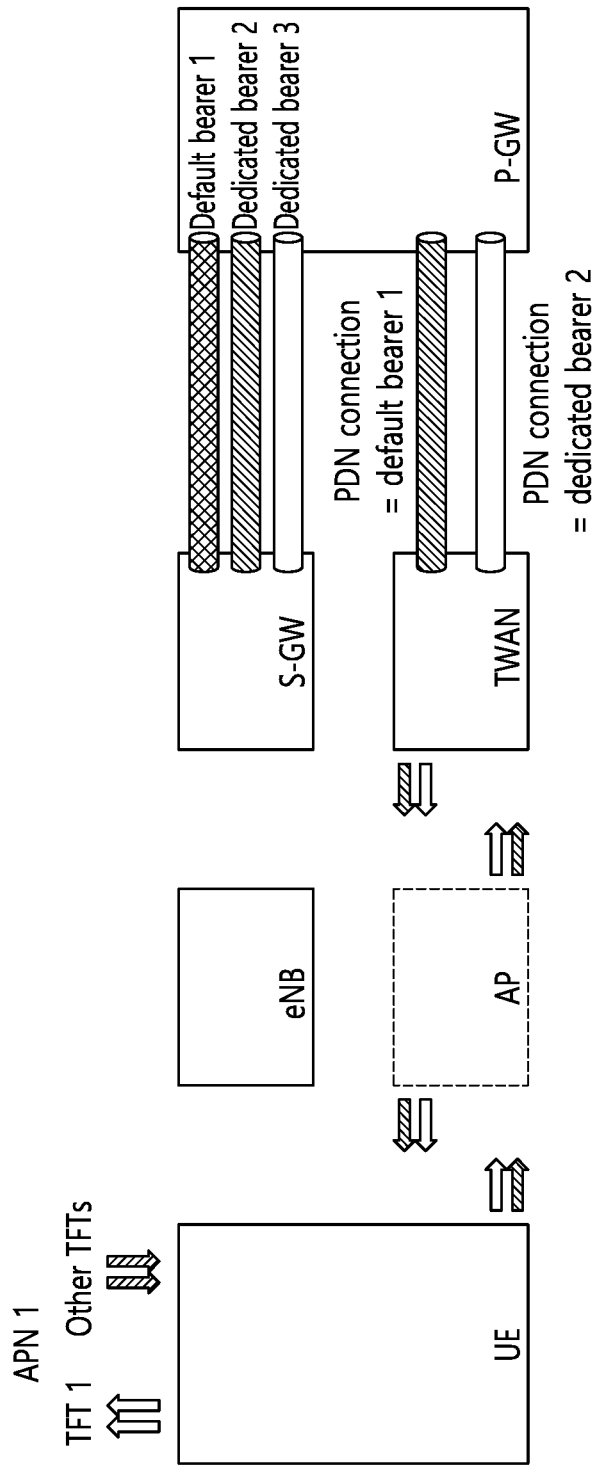
FIG. 14 illustrates an example of a bearer state after a virtual bearer is generated according to another embodiment of the present invention.

FIG. 14 illustrates an example of a bearer state after a virtual bearer is generated according to another embodiment of the present invention. Referring to FIG. 14, compared with the state before the virtual bearer is generated in FIG. 12, virtual bearers, default bearer 2 and dedicated bearer 3 are generated in addition to the existing default bearer 1 between the S-GW and P-GW according to the procedure for generating a virtual bearer of FIG. 13. The virtual default bearer 2 is mapped to the default bearer 1 between the TWAN and P-GW, and the virtual dedicated bearer 3 is mapped to the dedicated bearer 2 between the TWAN and P-GW.

Figure 15:
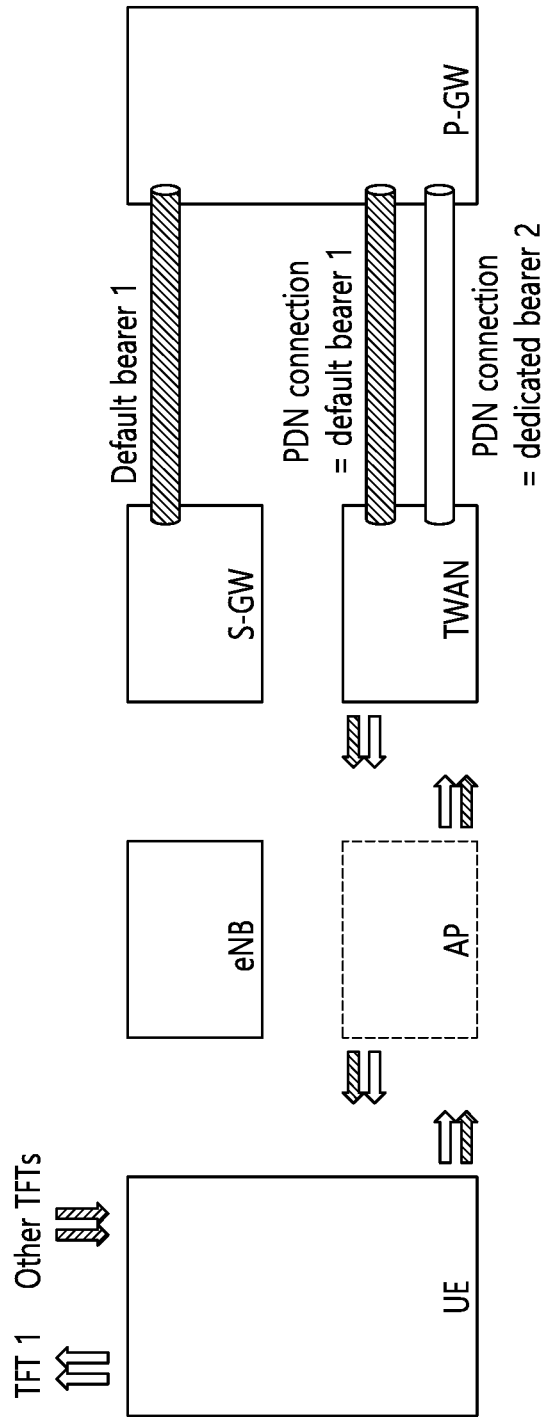
FIG. 15 illustrates an example of a bearer state before a virtual bearer is generated according to another embodiment of the present invention.

FIG. 15 illustrates an example of a bearer state before a virtual bearer is generated according to another embodiment of the present invention. Referring to FIG. 15, there is an existing PDN connection mapped to a virtual bearer between the S-GW and P-GW, and there exists a default bearer between the S-GW and P-GW. However, it is assumed that the MME does not know the information about a dedicated bearer generated through the Wi-Fi network. There already exist PDN connections corresponding to the default bearer 1 and the dedicated bearer 2 between the TWAN and P-GW.

Figure 16:
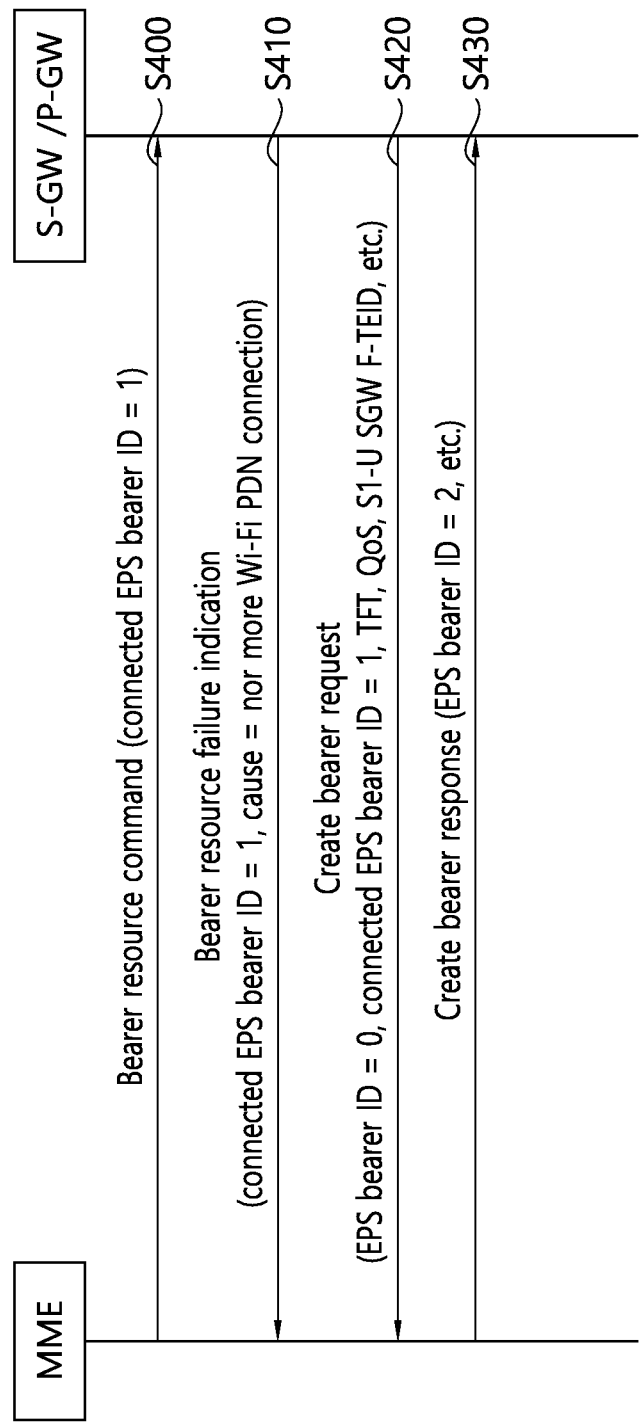
FIG. 16 illustrates an example of a procedure for generating a virtual bearer according to another embodiment of the present invention.

FIG. 16 illustrates an example of a procedure for generating a virtual bearer according to another embodiment of the present invention. FIG. 16 illustrates a method for generating a virtual bearer when there is an existing PDN connection mapped to a virtual bearer between the S-GW and P-GW, and there exists a default bearer as in FIG. 15.

In step S400, the MME requests to check whether a new PDN connection (namely EPS dedicated bearer) has been generated by transmitting a bearer resource command to the S-GW/P-GW. The bearer resource command may include a connected EPS bearer ID, etc., which is default bearer information, and may inform that the corresponding bearer resource command commands establishing a virtual bearer for a Wi-Fi PDN connection.

In the absence of additional traffic flow transmitted and received through the Wi-Fi network, the P-GW transmits bearer resource failure indication to the MME in step S410. The bearer resource failure indication may include a connected EPS bearer ID and a cause indicating that there is no more Wi-Fi PDN connection.

In the presence of additional traffic flow transmitted and received through a Wi-Fi network, the P-GW creates an S5 bearer by transmitting a create bearer request to the MME in step S420. The create bearer request may include an EPS bearer ID, connected EPS bearer ID, information of traffic flow transmitted and received through a Wi-Fi network, and QoS (QCI, ARP, APN-AMBR, and UE-AMBR) to be applied to a cellular network for the flow. The MME transmits a create bearer response to the S-GW/P-GW in step S430. The create bearer response may include the EPS bearer ID. Also, if there exists an additional dedicated bearer in the Wi-Fi network, the P-GW may request creation of an S5 bearer by taking into account the existence of the additional dedicated bearer.

Figure 17:
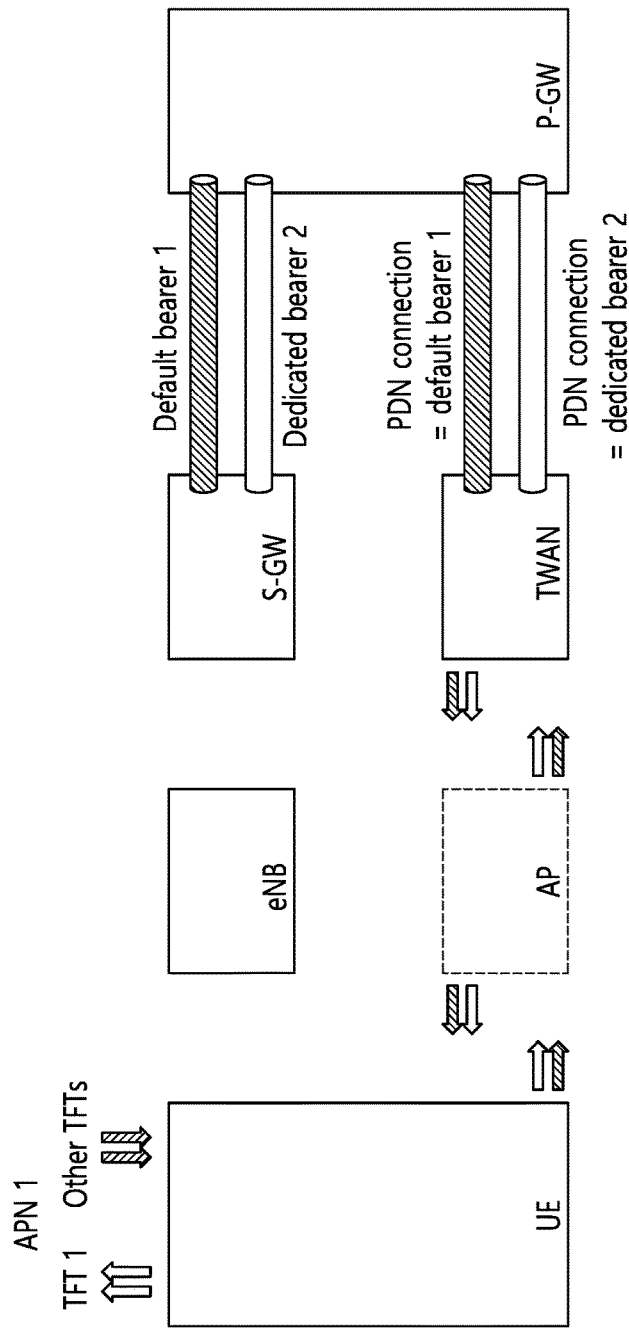
FIG. 17 illustrates an example of a bearer state before a virtual bearer is generated according to another embodiment of the present invention.

FIG. 17 illustrates an example of a bearer state before a virtual bearer is generated according to another embodiment of the present invention. Referring to FIG. 17, compared with the state before the virtual bearer is generated in FIG. 15, a dedicated bearer 2, a virtual bearer, is generated in addition to an existing default bearer 1 between the S-GW and P-GW according to the procedure for generating a virtual bearer of FIG. 16. The existing default bearer 1 is mapped to the default bearer 1 between the TWAN and P-GW, and the virtual dedicated bearer 2 is mapped to the dedicated bearer 2 between the TWAN and P-GW.

Figure 18:
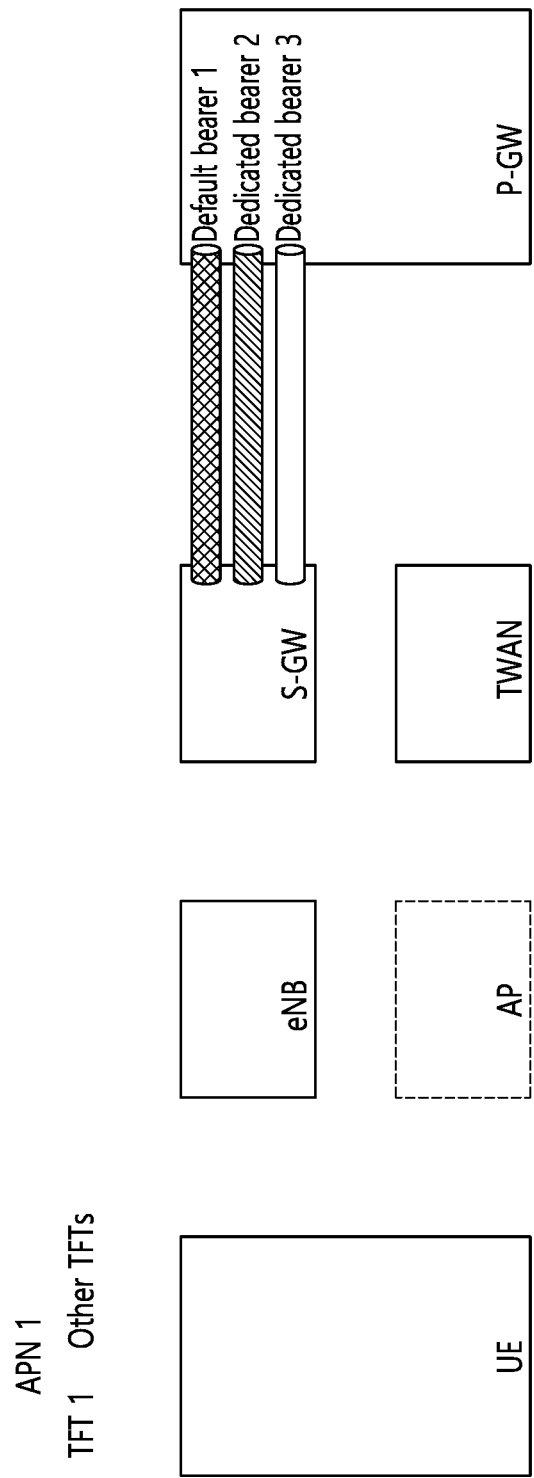
FIG. 18 illustrates an example of releasing a virtual bearer according to an embodiment of the present invention.

FIG. 18 illustrates an example of releasing a virtual bearer according to an embodiment of the present invention. The MME may trigger release of a virtual bearer. In the absence of a specific PDN connection through a Wi-Fi network, the MME may maintain or release the virtual bearer of the cellular network corresponding to the specific PDN connection. The embodiment of FIG. 18 illustrate a case in which a virtual bearer of the cellular network is retained even though the PDN connection for the Wi-Fi network is released.

In what follows, described will be a procedure for transmitting virtual bearer establishment information according to an embodiment of the present invention.

Figure 19:
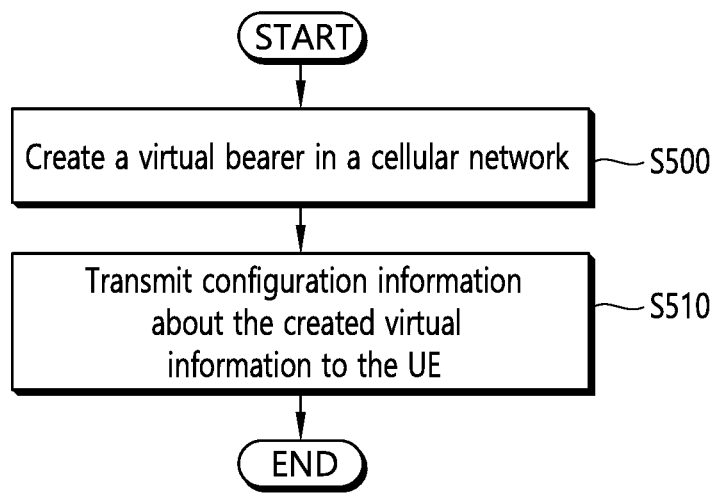
FIG. 19 illustrates an example of a procedure for transmitting virtual bearer establishment information according to an embodiment of the present invention.

FIG. 19 illustrates an example of a procedure for transmitting virtual bearer establishment information according to an embodiment of the present invention. In step S500, the MME establishes a virtual bearer in the cellular network, and in step S510, the MME transmits establishment information for the generated virtual bearer to the UE. In case the generated virtual bearer is a default bearer, the MME may transmit an activate default EPS bearer context request message by including in the message the information that the corresponding establishment information and the corresponding information are related to the virtual bearer of the cellular network mapped to the PDN connection established through the Wi-Fi network. In case the generated virtual bearer is a dedicated bearer, the MME transmit an activate default EPS bearer context request message or a modify EPS bearer context request message by including the information that the corresponding establishment information and the corresponding information are related to a virtual bearer of the cellular network mapped to the PDN connection established through the Wi-Fi network. Transmission of the virtual bearer establishment information may be triggered when a cellular network node determines movement/integrated transmission of a PDN connection from the Wi-Fi network to the cellular network or when the UE which has requested context pre-establishment requests PDN connection/integrated transmission from the Wi-Fi network to the cellular network.

Figure 20:
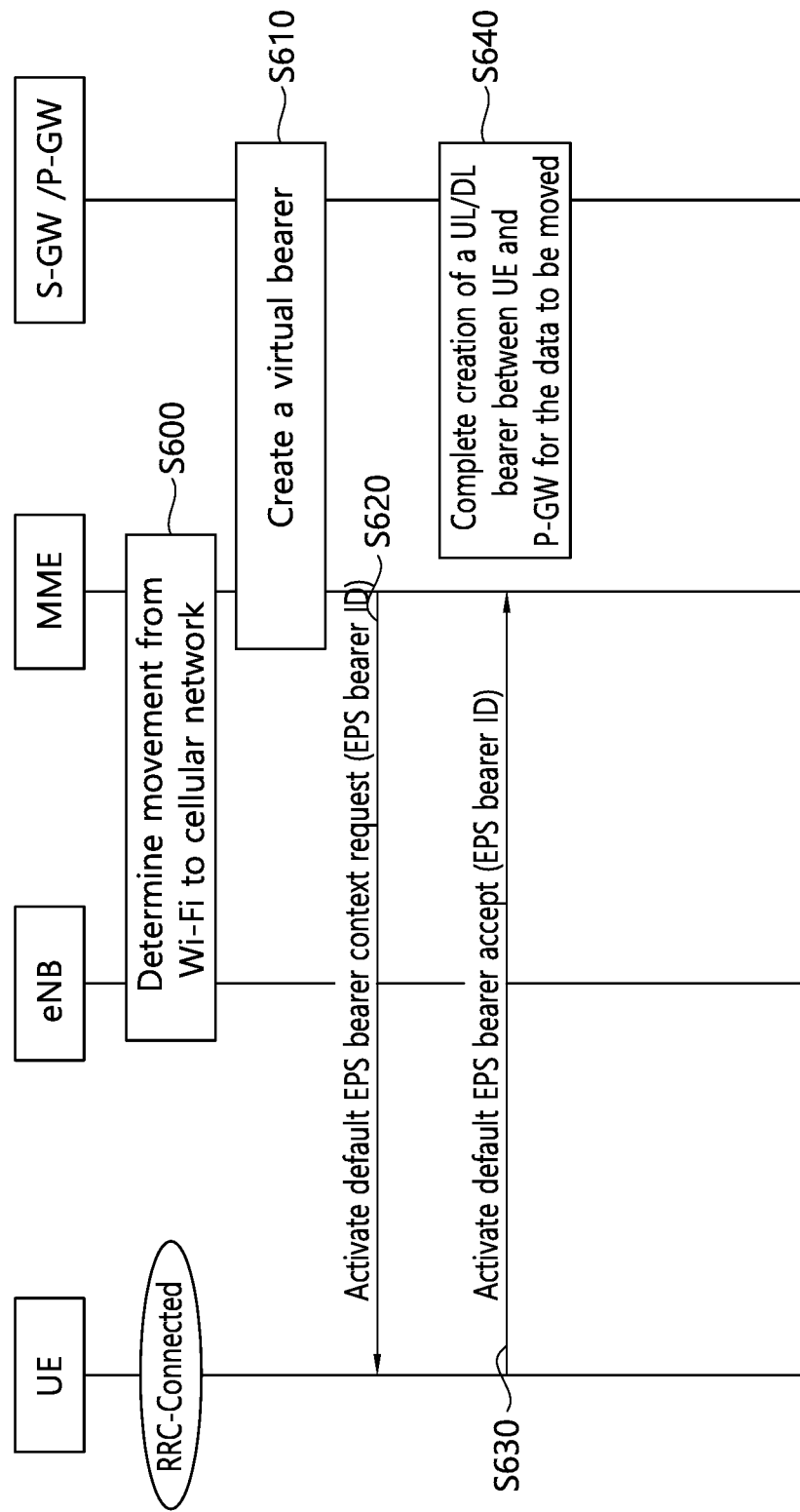
FIG. 20 illustrates an example of a procedure for transmitting virtual bearer establishment information according to an embodiment of the present invention.

FIG. 20 illustrates an example of a procedure for transmitting virtual bearer establishment information according to an embodiment of the present invention. FIG. 20 illustrates a case in which a cellular network node (namely eNB or MME) determines movement/integrated movement of a PDN connection from the Wi-Fi network to the cellular network.

Referring to FIG. 20, in step S600, the eNB or MME determines movement of a PDN connection from the Wi-Fi network to the cellular network. Accordingly, in step S610, a virtual bearer is generated between the MME and S-GW/P-GW. In step S620, the MME transmits to the UE an activate default EPS bearer context request including information about the generated virtual bearer. In step S630, the UE transmits an activate default EPS bearer context accept to the MME. Accordingly, in step S640, generation of a UL/DL bearer between the UE and P-GW for the data to be moved may be completed.

Figure 21:
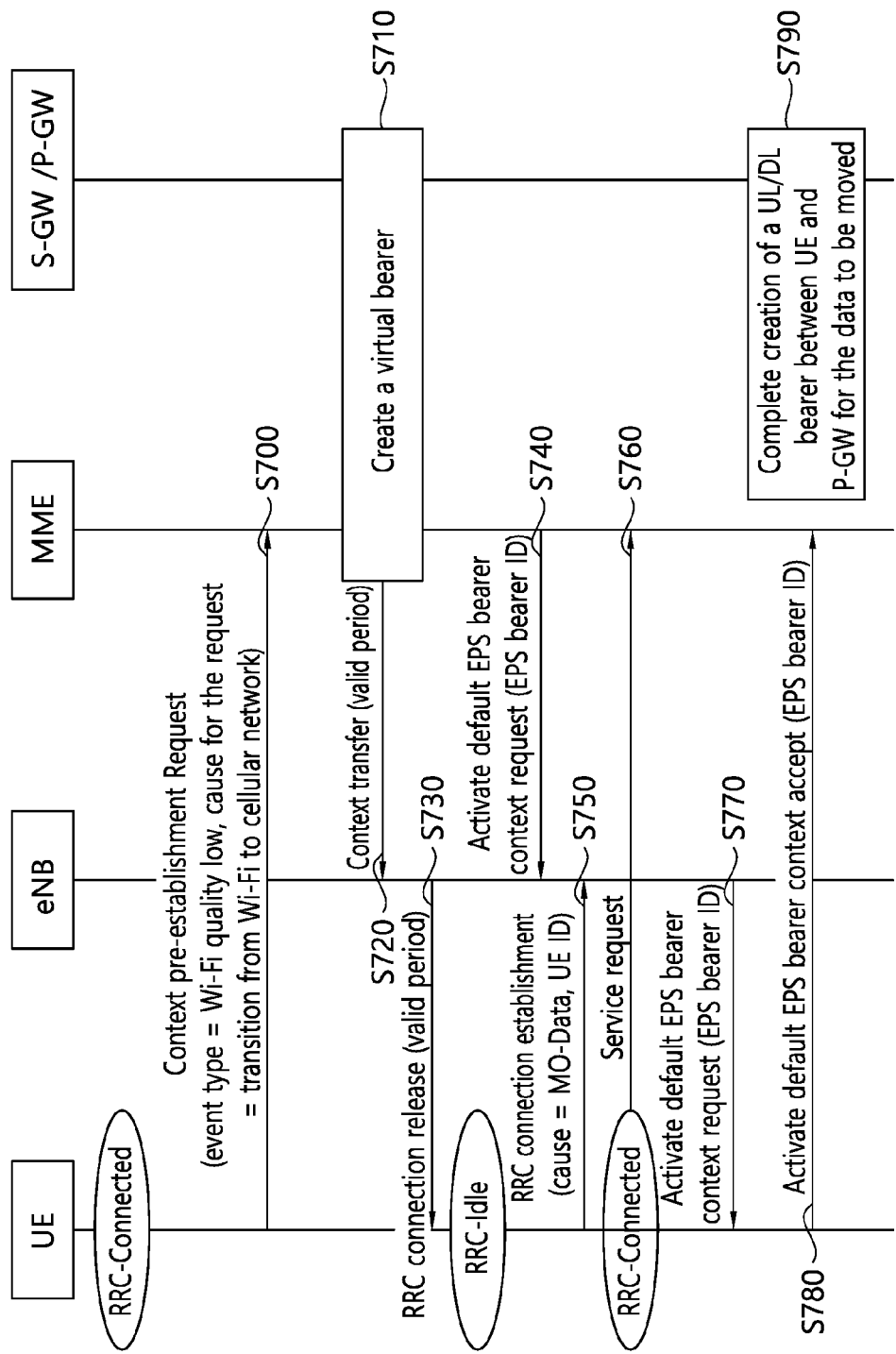
FIG. 21 illustrates an example of a procedure for transmitting virtual bearer establishment information according to another embodiment of the present invention.

FIG. 21 illustrates an example of a procedure for transmitting virtual bearer establishment information according to another embodiment of the present invention. FIG. 21 illustrates a case in which the UE which has requested context pre-establishment determines movement/integrated transmission of a PDN connection from the Wi-Fi network to the cellular network.

Referring to FIG. 21, in step S700, the UE transmits a context pre-establishment request to the MME. The context pre-establishment request may include an event type indicating the quality of the Wi-Fi network is bad and a cause for the request indicating transition from the Wi-Fi network to the cellular network. Accordingly, in step S710, a virtual bearer is generated between the MME and S-GW/P-GW.

In step S720, the MME transmits to the eNB context transfer including UE ID, E-UTRAN radio access bearer (E-RAB) ID, QoS, and valid period, etc. In step S730, the eNB transmits RRC connection release including the valid period to the UE, and accordingly, the UE transits to the RRC_IDLE state. In step S740, the MME transmits an activate default EPS bearer context request including information about a generated virtual bearer to the eNB.

In step S750, the UE transmits an RRC connection establishment message to the eNB and transits to the RRC_CONNECTED state. In step S760, the UE transmits a service request to the MME. In step S770, the eNB transmits to the UE an activate default EPS bearer context request including information about a generated virtual bearer. In step S780, the UE transmits an activate default EPS bearer context accept to the MME. Accordingly, in step S790, generation of a UL/DL bearer between the UE and P-GW for the data to be moved may be completed.

Figure 22:
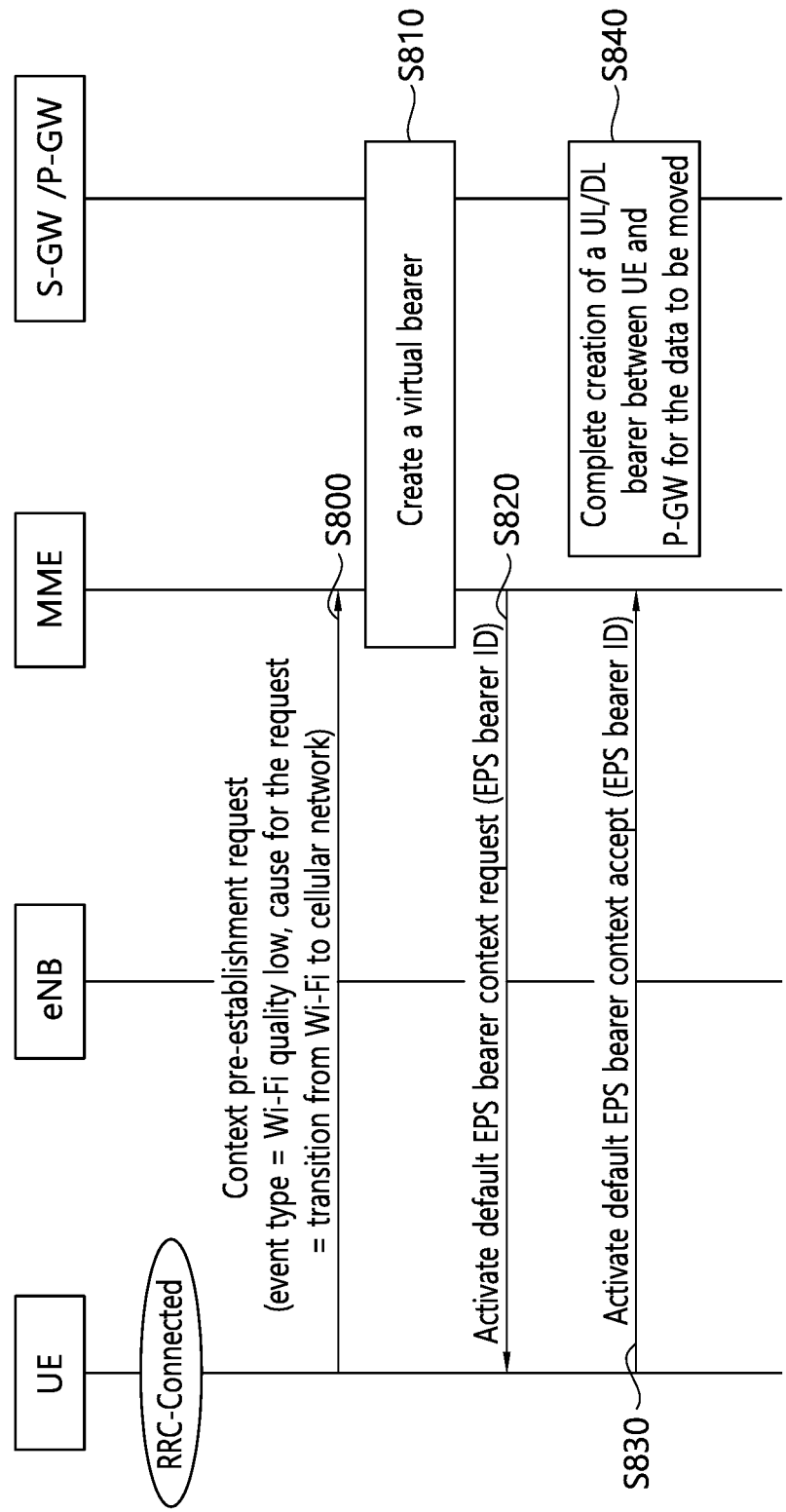
FIG. 22 illustrates an example of a procedure for transmitting virtual bearer establishment information according to another embodiment of the present invention.

FIG. 22 illustrates an example of a procedure for transmitting virtual bearer establishment information according to another embodiment of the present invention. FIG. 22 illustrates a case in which the UE which has requested context pre-establishment determines movement/integrated transmission of the PDN connection from the Wi-Fi network to the cellular network.

Referring to FIG. 22, in step S800, the UE transmits a context pre-establishment request to the MME. The context pre-establishment request may include an event type indicating the quality of the Wi-Fi network is bad and a cause for the request indicating transition from the Wi-Fi network to the cellular network. Accordingly, in step S810, a virtual bearer is generated between the MME and S-GW/P-GW. In step S820, the MME transmits an activate default EPS bearer context accept including information about the generated virtual bearer to the UE. In step S830, the UE transmits an activate default EPS bearer context accept to the MME. Accordingly, in step S840, generation of a UL/DL bearer for the data to be moved between the UE and P-GW may be completed.

Figure 23:
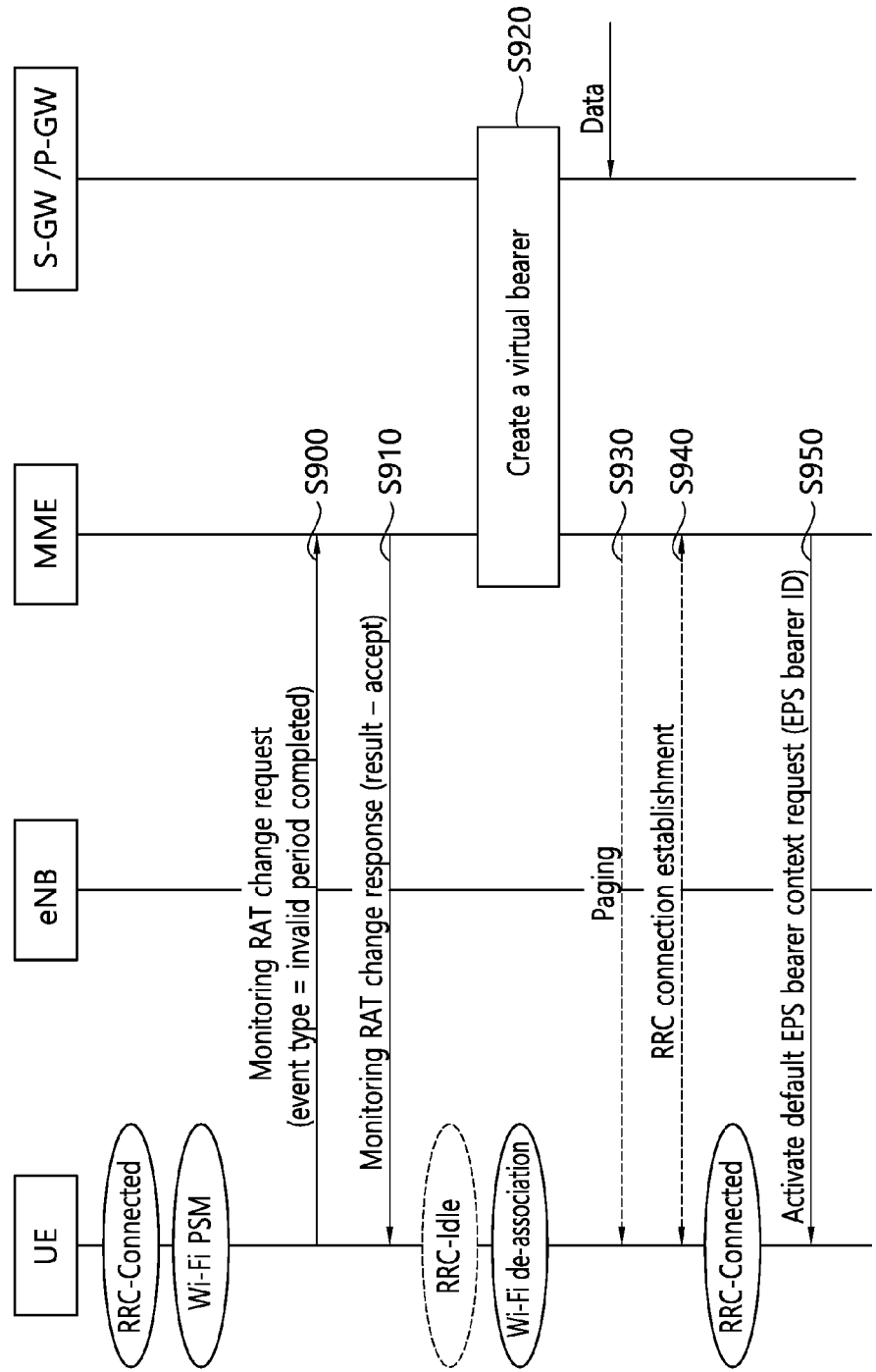
FIG. 23 illustrates an example of a procedure for transmitting virtual bearer establishment information according to another embodiment of the present invention.

FIG. 23 illustrates an example of a procedure for transmitting virtual bearer establishment information according to another embodiment of the present invention. FIG. 23 illustrates a case in which occurrence of traffic is informed to the UE which has requested change of paging monitoring RAT by transmitting a paging signal to the UE. In a heterogeneous network (HetNet) environment, a cellular network that does not have a coverage hole has to supervise mobility of UEs, a UE connected to the Wi-Fi network has to monitor the cellular network as well as the Wi-Fi network. However, it is inefficient for a UE in a Wi-Fi power saving mode (PSM) to monitor both of the two RATs in terms of power consumption, and moreover, signaling for maintaining an IPsec tunnel between the UE and ePDG occurs periodically. For example, dead peer detection (DPD) may occur, the default value of which is 10 seconds and ranges from 1 to 65535 seconds.

Referring to FIG. 23, in step S900, the UE in the Wi-Fi PSM mode transmits a monitoring RAT change request to the eNB or MME. The monitoring RAT change request may include an event type indicating that deactivate time has completed. The monitoring RAT change request may be triggered by screen off, deactivate time, or the number of DPDs, etc. In step S910, the eNB or MME transmits to the UE a monitoring RAT change response including the result of accept. In step S920, a virtual bearer is generated between the MME and S-GW/P-GW. Afterwards, the UE performs disassociation from the Wi-Fi network.

In step S930, the MME may transmit a paging signal to the UE. In step S940, an RRC connection may be established between the UE and eNB. In step S950, the MME transmits to the UE an activate default EPS bearer context request including information about the generated virtual bearer.

Figure 24:
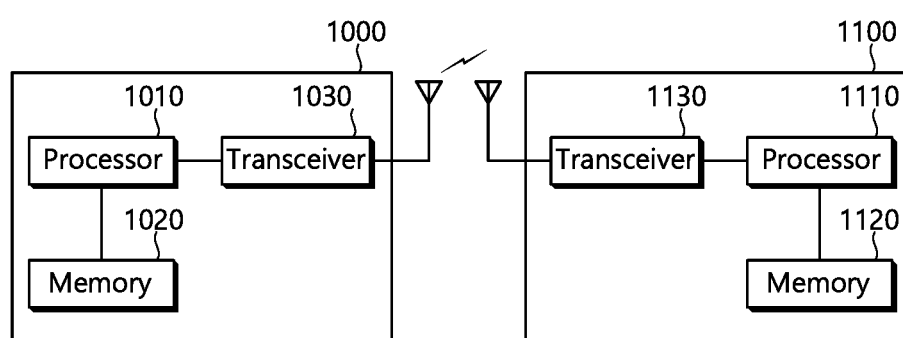
FIG. 24 shows a wireless communication system to implement an embodiment of the present invention.

FIG. 24 shows a wireless communication system to implement an embodiment of the present invention.

A first node 1000 includes a processor 1010, a memory 1020, and a transceiver 1030. The processor 1010 may be configured to implement proposed functions, procedures, and/or methods in this description. Layers of the radio interface protocol may be implemented in the processor 1010. The memory 1020 is operatively coupled with the processor 1010 and stores a variety of information to operate the processor 1010. The transceiver 1030 is operatively coupled with the processor 1010, and transmits and/or receives a radio signal.

A second node 1100 includes a processor 1110, a memory 1120, and a transceiver 1130. The processor 1110 may be configured to implement proposed functions, procedures, and/or methods in this description. Layers of the radio interface protocol may be implemented in the processor 1110. The memory 1120 is operatively coupled with the processor 1110 and stores a variety of information to operate the processor 1110. The transceiver 1130 is operatively coupled with the processor 1110, and transmits and/or receives a radio signal.

The processors 1010, 1110 may include application-specific integrated circuit (ASIC), other chipset, logic circuit and/or data processing device. The memories 1020, 1120 may include read-only memory (ROM), random access memory (RAM), flash memory, memory card, storage medium and/or other storage device. The transceivers 1030, 1130 may include baseband circuitry to process radio frequency signals. When the embodiments are implemented in software, the techniques described herein can be implemented with modules (e.g., procedures, functions, and so on) that perform the functions described herein. The modules can be stored in memories 1020, 1120 and executed by processors 1010, 1110. The memories 1020, 1120 can be implemented within the processors 1010, 1110 or external to the processors 1010, 1110 in which case those can be communicatively coupled to the processors 1010, 1110 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for generating a virtual bearer by a mobility management entity (MME) in a wireless communication system, the method comprising:
    obtaining context information from any one of a home subscriber server (HSS), an evolved packet data gateway (ePDG), or a trusted wireless local area network (WLAN) access network (TWAN), wherein the context information, which includes at least one of an access point name (APN), a PDN gateway (PDN GW) identity (ID), and a quality of service (QoS) parameter, is used for a packet data network (PDN) connection generated through a Wi-Fi network;
    transmitting a create session request to a serving gateway (S-GW) or a PDN gateway (P-GW) when there is no PDN connection in a cellular network mapped to the PDN connection, and there is no default bearer in the cellular network, wherein the create session request includes the context information;
    generating a virtual bearer in the cellular network based on the create session request; and
    transmitting establishment information for the virtual bearer to a user equipment (UE), wherein an uplink/downlink (UL/DL) bearer between the UE and the P-GW, for data to be transmitted, is generated based on the establishment information.

2. The method of claim 1, wherein a create session response, including information about traffic flow transmitted through the Wi-Fi network and a QoS parameter to be applied to the cellular network for the traffic flow, is received from the P-GW, in response to the create session request.

3. The method of claim 1, wherein, in case there is no PDN connection in the cellular network mapped to the PDN connection, but there exists a default bearer in the cellular network, the generating the virtual bearer comprises transmitting a bearer resource command to an S-GW or a P-GW.

4. The method of claim 3, wherein the virtual bearer generated by the bearer resource command corresponds to a dedicated bearer.

5. The method of claim 3, wherein a create bearer request, including information about traffic flow transmitted through the Wi-Fi network and a QoS parameter to be applied to the cellular network for the traffic flow, is received from the P-GW, in response to the bearer resource command.

6. The method of claim 1, wherein, in case there exists a PDN connection in the cellular network mapped to the PDN connection and there exists a default bearer in the cellular network, the generating the virtual bearer comprises transmitting a bearer resource command to an S-GW or a P-GW.

7. The method of claim 6, wherein the bearer resource command indicates checking whether a new PDN connection has been generated.

8. The method of claim 6, wherein, in case there is no traffic flow transmitted through the Wi-Fi network, a bearer resource failure indication is received from the P-GW in response to the bearer resource command.

9. A mobility management entity (MME) in a wireless communication system, the MME comprising:
    a memory;
    a transceiver; and
    a processor, operatively coupled to the memory and the transceiver, wherein the processor is configured to:
    obtain context information from any one of a home subscriber server (HSS), an evolved packet data gateway (ePDG), or a trusted wireless local area network (WLAN) access network (TWAN), wherein the context information, which includes at least one of an access point name (APN), a PDN gateway (PDN GW) identity (ID), and a quality of service (QoS) parameter, is used for a packet data network (PDN) connection generated through a Wi-Fi network,
    transmit a create session request to a serving gateway (S-GW) or a PDN gateway (P-GW) when there is no PDN connection in a cellular network mapped to the PDN connection, and there is no default bearer in the cellular network, wherein the create session request includes the context information,
    generate a virtual bearer in the cellular network based on the create session request, and
    transmit establishment information for the virtual bearer to a user equipment (UE), wherein an uplink/downlink (UL/DL) bearer between the UE and the P-GW, for data to be transmitted, is generated based on the establishment information.

* * * * *